United States Patent
Mackenzie

(10) Patent No.: US 11,440,420 B2
(45) Date of Patent: Sep. 13, 2022

(54) APPARATUS AND SYSTEM FOR CONNECTING ELECTRIC VEHICLES TO AN ELECTRICAL NETWORK AND METHOD OF USE

(71) Applicant: TROJAN ENERGY LIMITED, Stonehaven (GB)

(72) Inventor: Ian Mackenzie, Stonehaven (GB)

(73) Assignee: TROJAN ENERGY LIMITED, Stonehaven (GB)

(*) Notice: Subject to any disclaimer, the term of this patent is extended or adjusted under 35 U.S.C. 154(b) by 155 days.

(21) Appl. No.: 16/625,948

(22) PCT Filed: Jun. 28, 2018

(86) PCT No.: PCT/GB2018/051809
§ 371 (c)(1),
(2) Date: Dec. 23, 2019

(87) PCT Pub. No.: WO2019/002868
PCT Pub. Date: Jan. 3, 2019

(65) Prior Publication Data
US 2020/0156492 A1  May 21, 2020

(30) Foreign Application Priority Data

Jun. 28, 2017 (GB) .................................. 1710359
Apr. 16, 2018 (GB) .................................. 1806211

(51) Int. Cl.
*B60L 53/16* (2019.01)
*B60L 50/60* (2019.01)
(Continued)

(52) U.S. Cl.
CPC ............. *B60L 53/16* (2019.02); *B60L 50/60* (2019.02); *B60L 53/18* (2019.02); *B60L 53/305* (2019.02);
(Continued)

(58) Field of Classification Search
CPC ............................................... B60L 53/16
(Continued)

(56) References Cited

U.S. PATENT DOCUMENTS 6,371,768 B1    4/2002  Neblett et al.
2010/0283426 A1* 11/2010  Redmann .................. B60L 3/04
                                          320/109
(Continued)

FOREIGN PATENT DOCUMENTS

CN    204179717 A    2/2015
CN    104915771 A    9/2015
(Continued)

OTHER PUBLICATIONS

International Search Report dated Sep. 26, 2018.

*Primary Examiner* — Jerry D Robbins
(74) *Attorney, Agent, or Firm* — FisherBroyles, LLP

(57) ABSTRACT

An access connector, system and methods for accessing an electrical network are described. The access connector comprises a body portion configured to be installed in roadside infrastructure such that the access connector is substantially flush with an outer surface of the of the roadside infrastructure. The access connector provides a mechanical and electrical connection point for an electrical vehicle connector. The system comprises a plurality of access connectors.

36 Claims, 23 Drawing Sheets

(51) Int. Cl.
   *H01R 13/42*   (2006.01)
   *B60L 55/00*   (2019.01)
   *B60L 53/18*   (2019.01)
   *B60L 53/30*   (2019.01)
   *B60L 53/36*   (2019.01)

(52) U.S. Cl.
   CPC .............. *B60L 55/00* (2019.02); *H01R 13/42* (2013.01); *B60L 53/36* (2019.02)

(58) Field of Classification Search
   USPC ........................................................ 320/109
   See application file for complete search history.

(56) References Cited

U.S. PATENT DOCUMENTS

| | | | |
|---|---|---|---|
| 2011/0202418 A1* | 8/2011 | Kempton | G06Q 30/0601 705/26.1 |
| 2011/0241619 A1* | 10/2011 | Young | B60L 53/14 320/109 |
| 2012/0229085 A1 | 9/2012 | Lau | |
| 2014/0089016 A1* | 3/2014 | Smullin | G06Q 10/02 705/5 |
| 2014/0354229 A1* | 12/2014 | Zhao | B60L 53/68 320/109 |
| 2017/0047679 A1* | 2/2017 | Garth | H01R 13/6275 |

FOREIGN PATENT DOCUMENTS

| | | | |
|---|---|---|---|
| DE | 102004048226 A1 | 4/2006 | |
| DE | 102013225196 A1 * | 6/2015 | ............. B60L 53/16 |
| EP | 0630078 B1 | 8/1998 | |
| EP | 2792535 A1 | 10/2014 | |
| EP | 2039557 B1 | 5/2017 | |
| GB | 2471879 A | 1/2011 | |
| GB | 2494368 A | 3/2013 | |
| GB | 2567629 A | 4/2019 | |
| JP | 2015230750 A | 12/2015 | |
| WO | WO1996/032768 A1 | 10/1996 | |
| WO | WO2011/065816 A3 | 6/2011 | |
| WO | WO2012/034216 A1 | 3/2012 | |
| WO | WO2014/063140 A1 | 4/2014 | |
| WO | WO2015/025201 A2 | 2/2015 | |
| WO | WO2015/196193 A1 | 12/2015 | |

* cited by examiner

APPARATUS AND SYSTEM FOR CONNECTING ELECTRIC VEHICLES TO AN ELECTRICAL NETWORK AND METHOD OF USE

This application is the U.S. National Stage of International Application No. PCT/GB2018/051809, which was filed on Jun. 28, 2018. This application also claims the benefit of the filing date of GB patent application No. 1710359.9, which was filed on Jun. 28, 2017, and GB patent application No. 1806211.7 which was filed on Apr. 16, 2018. The contents of all of these applications are hereby incorporated by reference.

The present invention relates to an apparatus and system for and method of connecting electric vehicles to an electrical grid network. In particular, the invention in one of its aspects relates to an access connector for connecting electric vehicles to the electrical grid network. The invention in one of its aspects relates to a system comprising a plurality of access connectors, wherein at least one of the plurality of access connectors is integrated into a pedestrian walkway, a car park, or into the ground adjacent a vehicle carriageway. the invention in one of its aspects relates to a system for connecting electric vehicles to the electrical grid network which comprises a control and distribution module and a plurality of access connectors.

BACKGROUND TO THE INVENTION

Electric vehicles for private and public transportation are increasing in use. Electric vehicles require charging points. However, there is a distinct lack of residential, on-street infrastructure available for the connection of electric vehicles: a problem which is becoming more prominent as their use increases. The general lack of publicly available and convenient charging facilities means that many drivers may be reluctant to switch to an electric vehicle, as this may be an unviable option for them.

Furthermore, existing facilities, such as conventional electric vehicle charging stations, are obstructive and require space, and the often long and trailing connection leads which run between electric vehicles and conventional charging stations pose trip hazards to passers-by. Such conventional charging stations are typically only able to serve one, or a small number of electric vehicle at a time, and, in general, there is a lack of such charging stations available to the public.

In addition to the lack of suitable infrastructure available to the public, the selection and choice which is afforded to electric vehicle users who wish to connect their vehicle to a charging point in terms of location, cost, speed and time is limited and inflexible.

US patent numbers U.S. Pat. Nos. 8,810,198 and 9,371,008 describe charging stations which can charge multiple electric vehicles at once. Each of these systems may only charge a relatively small number of vehicles at once, and in addition, the electric vehicles receiving charge from the charging stations described in U.S. Pat. Nos. 8,810,198 and 9,371,008 must be coupled to connection ports on the charging stations. This may result in congestion at the particular location in which the charging station is located and may therefore minimise the number of electric vehicles which are able to access the charging station at any one time.

SUMMARY OF THE INVENTION

There is generally a need for a system and/or method for connecting a number of electric vehicles (EVs) to an electrical network such as the electrical grid which is unobtrusive, discreet and safe.

There is generally a need for a system and/or method for connecting a number of EVs to an electrical network such as the electrical grid at points which are spatially distributed.

It is amongst the aims and objects of the invention to provide a system and/or method for connecting EVs to an electrical network such as the electrical grid which comprises a central component to which a number of EV access connection points are connected, and which provides power to and controls each EV access connection point from a central location.

It is amongst the aims and objects of the invention to provide an apparatus, system and/or method for connecting EVs to an electrical network such as the electrical grid which can be used to charge EVs.

It is amongst the aims and objects of the invention to provide a system and/or method for connecting EVs to an electrical network such as the electrical grid which can be used for EVs to transmit power back to the grid.

It is amongst the aims and objects of the invention to provide a system and/or method for EV users and/or system customers to select, monitor, control and change charging and/or discharging or transmission parameters (such as rate of charging, scheduled time of charging, cost of charging and charging power provided) via a remote and/or wireless user interface (UI) device.

Other aims and objects of the invention include proving different magnitudes and/or phases of electrical power to different access connectors and thus EVs depending upon the selection of the EV user and system customer and/or the present demand on the system (i.e. the total load being drawn from the system at any one time). The magnitude and/or phase of electrical power provided to an EV will affect how long the EV will take to charge, with larger and faster charging loads typically being billed at a more expensive rate. For example, a system may provide a maximum of three-phase electrical power, with single-phase electrical power being the lowest phase of electrical power available to system customers for charging.

Further aims and aspects of the invention will become apparent from the following description.

According to a first aspect of the invention, there is provided an access connector for accessing an electrical network, wherein the access connector is configured to be installed in roadside infrastructure to be substantially flush with an outer surface of the of the roadside infrastructure, and wherein the access connector provides a mechanical and electrical connection point for an electric vehicle connector.

The access connector may be integrated into a pedestrian walkway adjacent a vehicle carriageway.

The electrical network may be a conventional electrical grid suitable for municipal electricity supply. Thus, the access connector may facilitate and/or control the transmission of electrical power between the electrical network (such as the electrical grid and/or municipal electricity supply) and an electric vehicle, via the electric vehicle connector.

The access connector may be formed as a socket which may generally comprise a hollow cylindrical body portion with a main bore, which may be in the form of a central cylindrical bore, with an inner cylindrical wall defining the main bore. A locking plug may sit within the main bore of the access connector. The locking plug may be substantially cylindrical, or may be in the form of a ring (for example, an annular ring). The locking plug may be biased into a position in which the top of the locking plug lies flush with the top of the access connector, and/or may comprise a locking mechanism which may be operable to lock the locking plug into an upper position. The locking mechanism may also be operable to release the locking plug to allow downward movement of the locking plug into the bore of the access connector, in the event that a substantially downward pushing force is applied to said locking plug.

The locking plug may be axially movable in a body portion of the access connector, and may be configured to form a seal with the body portion of the access connector. The locking plug may therefore be a sealing plug, or may be a sealing ring.

The locking mechanism may comprise a locking component which may be substantially arranged in a recess in the inner wall of the main bore of the access connector. In a locked position, the locking component may protrude into the main bore of the access connector. In an unlocked position, the locking component may be retracted into the recess in the inner wall of the main bore of the access connector. The locking mechanism may comprise a locking component which may be in the form of a locking dog, which may be arranged around the main bore of the connector. In a locked position, the locking dog may protrude into the main bore of the access connector. In an unlocked position, the locking dog may be retracted into an annular recess away from the main bore of the access connector. The locking dog may be biased into a locked position.

The locking component may extend radially inwardly towards the main axis of the access connector in a locked condition. Alternatively, the locking component may extend radially outwardly from the main axis of the access connector in a locked condition.

Movement of the locking mechanism of the access connector between a locked and an unlocked position may be actuated by a motor. Alternatively, or in addition, movement of the locking mechanism may be actuated by a solenoid. The locking mechanism may be actuated mechanically or electronically or both. The locking mechanism of the access connector may be actuated using Radio Frequency Identification (RFID). The access connector may comprise an RFID reader and the locking mechanism may be operable to unlock the plug when the RFID reader senses a corresponding RFID chip proximate the access connector. The locking mechanism of the access connector may be actuated by more than one method. Alternatively, the locking mechanism of the access connector may be actuated to lock and unlock by different methods.

A part of the locking mechanism may be configured to move axially in the access connector, to thereby enable the locking component to move between its locked and unlocked conditions. Axial movement of the part of the locking mechanism may be actuated by a motor, optionally via a gear mechanism.

The locking component may be electrically conductive, and may be configured to provide electrical contact between the access connector and a corresponding connector.

The electrical vehicle connector may be an intermediate connector module which may be operable to be connected to an electric vehicle. The access connector may be designed to accept an intermediate connector module. The intermediate connector module may be inserted into the main bore of the access connector when the locking plug is unlocked, to connect an electric vehicle to the system. The locking mechanism of the access connector may be operable to lock an inserted intermediate connector module into place inside the access connector.

The locking mechanism of each access connector may also be operable to unlock and thus release an inserted intermediate connector module by operation of a releasing mechanism which may be provided as part of a intermediate connector module. Alternatively, or in addition, the releasing mechanism may be provided in the form of a key which corresponds to a lock on the access connector and/or an RFID chip which corresponds to the RFID reader which may be provided on the access connector. Alternative releasing mechanisms which are operable to actuate the locking mechanism of the access connector to unlock and release an intermediate connector module may be used, for example, the releasing mechanism may be provided in the form of a personal identification number (PIN) pad installed on the access connector which actuates the locking mechanism to unlock when a unique PIN is keyed in. Alternatively, or in addition, the releasing mechanism may be in the form of a control signal which may be sent from a user interface (UI) device to the respective access connector to actuate unlocking. A user may select to actuate the locking mechanism to unlock and release an intermediate connector module using their corresponding UI device.

The releasing mechanism may also be actuated automatically or by operator intervention if a user is unable to unlock the access connector to release an inserted intermediate connector module (for example, if they have forgotten the PIN for the PIN pad, if they have lost their UI device, or for any other suitable reason). The releasing mechanism may be actuated by an instruction to unlock, which may be sent to the access connector in the form of a control signal by a data processing and control centre. The user may be provided with a means to contact the data processing and control centre (e.g. a telephone number or an email address provided in a manual, or on the intermediate connector module) to request such an intervention.

The access connector may receive a cable comprising a power transmission line or lines and/or the communication transmission line or lines, wherein the cable may be received from the electrical network or a component connected thereto. The access connector may comprise contact elements which may be connected to said power and/or communication transmission lines and which may be operable to receive and transmit electrical power and/or communication signals (i.e. data) on to a connected electric vehicle.

The contact elements of the access connector may be located in the main bore of the access connectors. An electric vehicle connector such as an intermediate connector module may comprise contact elements which correspond to the contact elements of the access connector such that it may be operable to receive and/or transmit electrical power and/or communication signals (i.e. data) to and from the access connector. Faces of the of the contact elements may be oriented radially inwards, or may be oriented radially outwards.

The access connector may comprise a variety of one or more additional functional features, which may be selected from a group including, but not limited to: coloured LED lights to provide a visual indication of the status of the connector (i.e. in use, vacant, out of service), trace heating elements, cleaning rings, seals, a computer, pressure vents, valves and drains.

After insertion, the intermediate connector module may be locked in place in an access connector by the locking mechanism of the access connector. The intermediate connector module may comprise a locking component in the form of a slot which corresponds in shape to a locking component of the locking mechanism of the access connector. Preferably, the intermediate connector module may comprise an annular slot which corresponds to an annular locking ring arranged within a recess of each access connector. Preferably, after insertion of the intermediate connector module, the locking ring of the access connector will automatically lock the intermediate connector module in place.

According to a second aspect of the invention, there is provided a system for connecting electric vehicles to an electrical network, the system comprising:
a plurality of access connectors operable to receive power from the electrical network, wherein the plurality of access connectors are integrated into roadside infrastructure and configured to be substantially flush with an outer surface of the of the roadside infrastructure, and wherein each access connector of the plurality of access connectors provides a mechanical and electrical connection point for an electrical vehicle connector.

The plurality of access connectors may be integrated into a pedestrian walkway adjacent a vehicle carriageway.

Preferably, each access connector of the plurality of access connectors provides a connection point to the system for one electric vehicle at a time.

The electrical network may be a conventional electrical grid suitable for municipal electricity supply. Thus, the system may facilitate and/or control the transmission of electrical power between the electrical network (such as the electrical grid and/or municipal electricity supply) and the plurality of access connectors.

The system may control distribution and transmission of electrical power from the electrical network to one or more electric vehicles connected to the plurality of access connectors, and may therefore control the charging of electric vehicles connected to the system. Alternatively, or in addition, the system may control distribution and transmission of electrical power from one or more electric vehicles connected to the plurality of access connectors back to the electrical network, and may therefore control the discharging of electric vehicles connected to the system, and transmission and/or selling of power to the electrical network.

Each access connector of the plurality of access connectors may be connected to the electrical network by a cable, wherein each cable may provide a power transmission line and a communication transmission line between the electrical network and each respective access connector.

The system may comprise a control and distribution module operable to be connected to and serve a plurality of access connectors within a certain predetermined locality or vicinity. More than one local control and distribution module may be connected to the electrical network (i.e. the electrical grid) to be connected to and serve a plurality of access connectors in different localities or vicinities, for example in different streets, neighbourhoods, car parks, residential, business or retail areas.

Each access connector of the plurality of access connectors may be connected to the control and distribution module by a cable, each cable providing a power transmission line and a communication transmission line between the control and distribution module and each respective access connector. Thus, the system may control the transmission of electrical power between the electrical network and the plurality of access connectors via the control and distribution module.

The control and distribution module may comprise a discrete cable connection point for each cable connected to each respective access connector of the plurality of access connectors, each discrete connection point being operable to independently provide electrical power to each respective access connector.

Each discrete cable connection point may comprise different contact elements which may be connected to the power and/or communication transmission line or lines comprised of the cable and which may enable the selective transmission of different magnitudes and/or phases of electrical power to each access connector (i.e. single-phase and three-phase electrical power), and/or may provide different contact elements for the transmission of electrical power (such as instrumentation voltage power) required for additional functions of each access connector (such as lighting and heating). Each discrete cable connection point may enable transmission of data, control and communication signals to each access connector.

The control and distribution module may comprise a variety of one or more additional functional features, which may be selected from a group including, but not limited to: a metering module, an ambient temperature sensor, a residual current device (RCD) and fault sensing element, a computer, one or more communication modules which may facilitate communication to and from a data processing and control centre and/or user interface (UI) devices and/or the plurality of access connectors (and hence the respective electric vehicles coupled to the access connectors), a transformer, an inverter and a rectifier. The control and distribution module may comprise a variety of one or more additional functional features or components as required.

The plurality of access connectors may be spatially distributed access connectors, that is, the plurality of access connectors may be installed with a distance between one another. The plurality of access connectors may be installed at distances of, for example, between 4 m and 10 m between one another, at regular or irregular intervals.

The plurality of access connectors may be installed on or in the ground. The access connectors may be installed in a pedestrian walkway such as a pavement or sidewalk, or may be installed in a cycle path. The access connectors may be installed in a car park, or at the side of a vehicle carriageway, and may be adjacent a roadside, preferably within 0.5 m of the roadside. The access connectors may be installed in paving stones, kerbsides, kerbstones, gutter stones, or other components of roadside infrastructure. Preferably, the plurality of access connectors are installed in pedestrian walkways. The plurality of access connectors may be installed in more than one pedestrian walkway of different locations, directions and/or configurations. The plurality of access connectors may be installed on top of the ground (i.e. on top of the pavements, roads, kerbsides or other). Alternatively, or in addition, the plurality of access connectors may be wholly or partially sunken into the ground (i.e. sunken in to the pavements, roads, kerbsides or other). Preferably, each access connector of the plurality of access connectors is installed such that its top surface lies flush with the surface of the ground.

Alternatively, or in addition, an access connector of the plurality of access connectors may be installed on a property of a user (for example, in a garage or on a driveway) which may provide a private, personal connection point. This may be done at the request of a user or home owner.

Each access connector of the plurality of access connectors may be formed as a socket which may generally comprise a hollow cylindrical body portion with a main bore. A locking plug may sit within the main bore of the access connector. The locking plug may be substantially cylindrical, or may be in the form of a ring (for example, an annular ring). Each access connector may comprise a locking mechanism which may be operable to lock the locking plug into an upper position. The locking plug may be axially movable in a body portion of the access connector. The locking mechanism may also be operable to release the locking plug to allow downward movement of the locking plug into the bore of the access connector, in the event that a substantially downward pushing force is applied to said locking plug.

The locking mechanism of the access connector may be actuated using Radio Frequency Identification (RFID). The access connector may comprise an RFID reader and the locking mechanism may be operable to unlock the plug when the RFID reader senses a corresponding RFID chip proximate the access connector. The locking mechanism of the access connector may be actuated by more than one method. Alternatively, the locking mechanism of the access connector may be actuated to lock and unlock by different methods.

The system may comprise a plurality of intermediate connector modules. Each intermediate connector module may be operable to be connected to an electric vehicle. The intermediate connector module may be connected to an electric vehicle by a cable which may be fixed and/or detachable from the electric vehicle and/or the intermediate connector module. The cable may be a standard cable with standard connections intended for use with an electric vehicle. Alternatively, the intermediate connector module may be integrated into an electric vehicle, such that it is unable to detach. The intermediate connector module may be provided in the form of a lance.

Each access connector of the plurality of access connectors may be designed to accept an intermediate connector module. The intermediate connector module may be inserted into the main bore of the access connector when the locking plug is unlocked, to connect an electric vehicle to the system. The locking mechanism of the access connector may be operable to lock an inserted intermediate connector module into place inside the access connector.

The locking mechanism of each access connector may also be operable to unlock and thus release an inserted intermediate connector module by operation of a releasing mechanism.

The releasing mechanism may be provided as part of an intermediate connector module. Alternatively, or in addition, the releasing mechanism may be provided in the form of a key which corresponds to a lock on the access connector and/or an RFID chip which corresponds to the RFID reader which may be provided on the access connectors. Alternative releasing mechanisms which are operable to actuate the locking mechanism of the access connector to unlock and release an intermediate connector module may be used, for example, the releasing mechanism may be provided in the form of a personal identification number (PIN) pad installed on each access connector which actuates the locking mechanism to unlock when a unique PIN is keyed in. Alternatively, or in addition, the releasing mechanism may be in the form of a control signal which may be sent from a user interface (UI) device to the respective access connector to actuate unlocking. A user may select to actuate the locking mechanism to unlock and release an intermediate connector module using their corresponding UI device.

The releasing mechanism may also be actuated automatically or by operator intervention if a user is unable to unlock the access connector to release an inserted intermediate connector module (for example, if they have forgotten the PIN for the PIN pad, if they have lost their UI device, or for any other suitable reason). The releasing mechanism may be actuated by an instruction to unlock, which may be sent to the access connector in the form of a control signal by a data processing and control centre. The user may be provided with a means to contact the data processing and control centre (e.g. a telephone number or an email address provided in a manual, or on the intermediate connector module) to request such an intervention.

Each access connector of the plurality of access connectors may receive a cable comprising a power transmission line or lines and/or the communication transmission line or lines, wherein the cable may be received from each corresponding discrete cable connection point of the control and distribution module. Each access connector of the plurality of access connectors may comprise contact elements which may be connected to said power and/or communication transmission lines and which may be operable to receive and transmit electrical power and/or communication signals (i.e. data) on to a connected electric vehicle.

The contact elements of the access connectors may be located in a main bore of the access connectors. An intermediate connector module may comprise contact elements which correspond to the contact elements of each access connector such that it may be operable to receive and/or transmit electrical power and/or communication signals (i.e. data) to and from the access connector. Faces of the of the contact elements may be oriented radially inwards, or may be oriented radially outwards.

Each access connector of the plurality of access connectors may comprise a variety of one or more additional functional features, which may be selected from a group including, but not limited to: coloured LED lights to provide a visual indication of the status of the connector (i.e. in use, vacant, out of service), trace heating elements, cleaning rings, seals, a computer, pressure vents, valves and drains.

The cable comprising the power transmission line or lines and/or the communication transmission line or lines which connects each access connector of the plurality of access connectors to the control and distribution module may be installed subsurface (i.e. buried underground). Preferably, the cable comprising the power transmission line or lines and/or the communication transmission line or lines may be buried underneath pavements, roads, kerbsides and/or at other suitable locations as appropriate.

Each access connector of the plurality of access connectors may be connected to the control and distribution module via a cable comprising one or more power and/or communication transmission lines. Preferably, each access connector of the plurality of access connectors may be individually connected to the control and distribution module by a cable comprised of one or more dedicated power and/or communication transmission lines.

An intermediate connector module may be used and/or owned or leased by a system user such as an electric vehicle owner and/or user. Any number of intermediate connector modules may exist which correspond to and can be used in conjunction with the system, to connect any electric vehicle to the system. Any intermediate connector module which corresponds to the system may be may be inserted into any one available access connector of the plurality of access connectors at any one time.

The intermediate connector module may comprise a substantially cylindrical body. The body of the intermediate connector module may be shaped in such a way that the intermediate connector module can be inserted into any one of the plurality of access connectors in one radial orientation only.

The intermediate connector module may comprise contact elements which correspond to contact elements installed within each access connector of the plurality of access connectors. Preferably, contact elements may be installed on the side wall of the intermediate connector module and may correspond to the axial and radial position of the contact elements in each access connector of the plurality of access connectors when the intermediate connector module is inserted into an access connector of the system. The contact elements of the intermediate connector module may be operable to receive and/or transmit power and/or data to and from an access connector of the system and to and from an electric vehicle to which it is coupled.

The intermediate connector module may comprise an opening mechanism which is operable to actuate a locking mechanism of each access connector of the plurality of access connectors to permit its insertion. The opening mechanism may comprise an RFID chip which corresponds to an RFID reader contained within each access connector of the plurality of access connectors. Therefore, any intermediate connector module may be operable to open any access connector of the plurality of connectors of the system. Alternatively, or in addition, the system may be programmed, temporarily or otherwise, to allow the opening mechanism of an intermediate connector module to actuate the locking mechanism of only one specific access connector of the plurality of access connectors, for example if the access connector in question has been pre-booked by a user. The intermediate connector module opening mechanism may only be operable to unlock the locking mechanism of the access connector when the intermediate connector module is not inserted into the access connector.

After insertion, the intermediate connector module may be locked in place in an access connector by the locking mechanism of the access connector. The intermediate connector module may comprise a locking component in the form of a slot which corresponds in shape to a locking component of the locking mechanism of the access connector. Preferably, the intermediate connector module may comprise an annular slot which corresponds to an annular locking ring arranged within a recess of each access connector. Preferably, after insertion of the intermediate connector module, the locking ring of the access connector will automatically lock the intermediate connector module in place.

The intermediate connector module may comprise a releasing mechanism which is also operable to actuate the locking mechanism of the access connector to unlock and release the intermediate connector module. The intermediate connector module releasing mechanism may only be operable to unlock the locking mechanism of the access connector when the intermediate connector module is locked inside the access connector. The intermediate connector module releasing mechanism may comprise a PIN pad on the intermediate connector module which sends a signal to the access connector to actuate the locking mechanism when a unique code is keyed in. Alternatively, or in addition, an independent releasing mechanism which works in conjunction with each of the plurality of access connectors may be provided to actuate the locking mechanism of each access connector to unlock and release the intermediate connector module. This may be provided in the form of a key which corresponds to a lock on the access connectors and/or an RFID fob which corresponds to the RFID reader on the access connectors. Alternative releasing mechanisms which are operable to actuate the locking mechanism of the access connector to unlock and release the intermediate connector module may be used, and may be provided in the form of a PIN pad installed on each access connector which sends a signal to the locking mechanism when a unique code is keyed in or a user selecting to actuate the locking mechanism to unlock and release the intermediate connector module using their UI device, which sends a control signal to the access connector.

The intermediate connector module may comprise a cable which may be operable to connect the intermediate connector module to an electric vehicle. The cable which connects the intermediate connector module and the electric vehicle may comprise one or more power and/or communication transmission cables. The cable may be continuous or may comprise various connections. The cable may comprise a breakaway connection. The cable may be coupled to an electric vehicle at its other end. Alternatively, the cable may comprise a conventional connector at its other end which is operable to be connected into a corresponding receptacle in an electric vehicle and which is capable of transmitting both power and data.

The intermediate connector module may comprise a handle. Alternatively, or in addition, the intermediate connector module may comprise an extension piece to extend the height of the intermediate connector module which in addition may comprise a handle. Various extension pieces may be available for the intermediate connector module. The extension piece and the body of the intermediate connector module may be connected to each other via a screw threaded connection or via any other suitable connection.

Embodiments of the second aspect of the invention may include one or more features of the first aspect of the invention or its embodiments, or vice versa.

According to a third aspect of the invention, there is provided a method of connecting an electrical vehicle to an electrical network using the access connector and/or system of the first or second aspects of the invention.

The method may comprise providing an intermediate connector module which may be operable to be connected to an electric vehicle, wherein the access connector may be designed to accept an intermediate connector module.

The method may comprise bringing the intermediate connector module into proximity with the access connector, such that the access connector may detect or be alerted to the presence of the intermediate connector module.

The access connector may be unlocked. Preferably, a locking mechanism of the access connector unlocks upon detecting the intermediate connector module, thus allowing a locking plug of the access connector to be moved axially within a main bore of the access connector.

The method may comprise inserting the intermediate connector module, when the locking plug is unlocked, thus pushing the locking plug downwards into the main bore of the access connector.

Upon insertion, the intermediate connector module may be in electrically conductive contact with the access connector. Electrically conductive contact elements of the intermediate connector module may be brought into contact with electrically conductive contact elements of the access connector.

The method may comprise actuating the locking mechanism to lock the intermediate connector module in to place, once it has been inserted into the access connector.

The method may comprise an identification and/or authentication step in which the user of the electric vehicle is identified to the system. This may be done by sending a signal to the system which may be done via a mobile data communication link between the access connector, and/or the intermediate connector module and/or a remote UI device, as well as any other suitable component.

The method may comprise running a test, to ensure that safe and effective electrical connection has been made up between the electric vehicle and the system (via the intermediate connector module and the access connector).

If a safe and effective connection between the electric vehicle and the system is confirmed, the method may comprise making a power cable from the electrical network which supplies the access connector live, to transmit electrical power to the electric vehicle.

The method may comprise transmitting power to the electric vehicle. The power may be transmitted according to user-specific settings, which may be communicated and controlled via a mobile data communication link between the access connector, and/or the intermediate connector module and/or a remote UI device, as well as any other suitable component.

Embodiments of the third aspect of the invention may include one or more features of the first to second aspects of the invention or their embodiments, or vice versa.

According to a fourth aspect of the invention, there is provided a method of disconnecting an electrical vehicle from an electrical network using the access connector and/or system of the first or second aspects of the invention.

The method may comprise an electric vehicle user whose electric vehicle is connected to the system instructing the access connector to disconnect the electrical vehicle from the system. More specifically, the method may comprise instructing the access connector to unlock and release an intermediate connector module coupled to the electric vehicle.

The method may comprise removing the intermediate connector module from the access connector, and may subsequently comprise locking the access connector after removal of the intermediate connector module.

Embodiments of the fourth aspect of the invention may include one or more features of the first to third aspects of the invention or their embodiments, or vice versa.

According to a fifth aspect of the invention, there is provided a method of charging an electrical vehicle using the access connector and/or system of the first or second aspects of the invention.

The method may comprise monitoring the status of charge (i.e. percentage charged) of the electric vehicle connected to at least one of the plurality of access connectors.

The method may comprise controlling the electrical power transmission to the at least one of the plurality of access connectors in dependence on the status of charge (i.e. percentage charged) of the at least one electric vehicle.

Embodiments of the fifth aspect of the invention may include one or more features of the first to fourth aspects of the invention or their embodiments, or vice versa.

According to a sixth aspect of the invention, there is provided a system for connecting electric vehicles to an electrical network, the system comprising:
a plurality of access connectors operable to receive power from the electrical network, wherein at least one of the plurality of access connectors is integrated into a pedestrian walkway.

Embodiments of the sixth aspect of the invention may include one or more features of the first to fifth aspects of the invention or their embodiments, or vice versa According to a seventh aspect of the invention, there is provided an access connector for accessing an electrical network, the access connector having a locked condition and an unlocked condition, and wherein in the unlocked condition an intermediate connector module is operable to be to be connected to the access connector to access the electrical network.

Embodiments of the seventh aspect of the invention may include one or more features of the first to sixth aspects of the invention or their embodiments, or vice versa.

According to an eighth aspect of the invention, there is provided an access connector providing access to an electrical network, the access connector comprising:
an aperture and a locking plug moveably positioned within said aperture, where the connector has a first closed condition in which the top of the plug is flush with the top of the access connector and is locked in place, and a second open condition in which the plug is unlocked and downward movement of the plug within the aperture of the access connector is permitted.

Embodiments of the eighth aspect of the invention may include one or more features of the first to seventh aspects of the invention or their embodiments, or vice versa According to an ninth aspect of the invention, there is provided an intermediate connector module which is operable to unlock a plug of an access connector, placing the access connector into an open condition in which the plug may be moved downwards into an aperture of the access connector body.

Embodiments of the ninth aspect of the invention may include one or more features of the first to eighth aspects of the invention or their embodiments, or vice versa According to a further aspect of the invention, there is provided a system for connecting electric vehicles to an electrical network, the system comprising:
a plurality of access connectors operable to receive power from the electrical network, wherein at least one of the plurality of access connectors is integrated into the ground adjacent a vehicle carriageway.

According to a further aspect of the invention, there is provided a method of installing a system for connecting electric vehicles to an electrical network, the method comprising:
providing a control and distribution module connected to the electrical network; and
a plurality of access points;
wherein each access point of the plurality of access points is provided with a cable, each cable providing a power transmission line and a communication transmission line between the control and distribution module and each respective access point;
installing at least one access connector at a selected access point, by connecting one end of the cable to the access point, and an opposing end of the cable to the control and distribution module.

Preferably, installing the at least one access connector takes place in a second phase installation, a substantial time after the plurality of access points were installed.

Embodiments of the further aspect of the invention may include one or more features of the first to eighth aspects of the invention or their embodiments, or vice versa.

Alternative Aspects of the Invention

The following are alternative aspects of the invention and preferred or optional embodiments, and features thereof may be combined with preceding aspects of the invention or their preferred or optional embodiments and vice versa.

There may be provided a system for connecting electric vehicles to an electrical network, the system comprising:
a control and distribution module connected to the electrical network; and
a plurality of access connectors;
wherein each access connector of the plurality of access connectors is connected to the control and distribution module by a cable, each cable providing a power transmission line and a communication transmission line between the control and distribution module and each respective access connector;
and wherein the control and distribution module is operable to control transmission of electrical power between the plurality of access connectors and the electrical network.

The electrical network may be a conventional electrical grid suitable for municipal electricity supply. Thus, the system may control the transmission of electrical power between the electrical network (such as the electrical grid and/or municipal electricity supply) and the plurality of access connectors via the control and distribution module.

The system may control distribution and transmission of electrical power from the electrical network to one or more electric vehicles connected to the access connectors, and may therefore control the charging of electric vehicles connected to the system. Alternatively, or in addition, the system may control distribution and transmission of electrical power from one or more electric vehicles connected to the access connectors back to the electrical network, and may therefore control the discharging of electric vehicles connected to the system, and transmission and/or selling of power to the electrical network.

The power transmission line and/or the communication transmission line of each cable may be distinct physical lines comprised of the cable, or may be virtual transmission lines on the same or shared physical lines in the cable. Each cable may comprise more than one power transmission line and/or communication transmission line which may, for example, account for the provision and transmission of different magnitudes and/or phases of electrical power to the access connector.

Preferably, each access connector of the plurality of access connectors provides a connection point to the system for one electric vehicle at a time.

The control and distribution module may be connected directly to the electrical network, which may be the electrical grid. Alternatively, or in addition, it may be connected to an electrical substation of the electrical network, such as an electrical substation of the electrical grid, local or otherwise.

Preferably, the local control and distribution module is connected to a local electrical substation of the electrical grid. The electrical substation may function to step down the electrical supply voltage from a transmission level to a level suitable for local distribution and/or from high voltage to low voltage.

The electrical substation may transform three-phase electrical power from 6.6 kV to 415V. Alternatively, the electrical substation may transform three-phase electrical power from 11 kV to 415V. The electrical substation may therefore supply three-phase electrical power at 415V to the control and distribution module.

The control and distribution module may be connected to the electrical network via one or more power cables. Preferably, the control and distribution module is connected to an electrical substation of the electrical grid via one or more power cables.

The control and distribution module may be a secure unit, and may be installed on a pavement, road, kerbside, car park, or at any other suitable location. It may be installed above or below ground.

The control and distribution module may comprise switchgear to enable selective switching of electrical power distribution. Switchgear may be provided for each discrete cable connection point and hence each respective access connector of the plurality of access connectors to facilitate the transmission of and switching between different magnitudes and/or phases of electrical power provided to each access connector. The control and distribution module may provide each access connector with the same and/or different magnitudes and/or phases of electrical power interchangeably.

The control and distribution module may be connected to a data processing and control centre via a wired or wireless communication link. The data processing and control centre may be a remote data processing and control centre (i.e. the data processing and control centre may be located away from the control and distribution module). The data processing and control centre may be an automated, un-manned centre, or it may be manned by authorised personnel.

The data processing and control centre may receive data from the control and distribution module. Alternatively, or in addition, it may send data and control signals to the control and distribution module. For example, it may receive data relating to the number of access connectors of the plurality of access connectors which are currently in use, the total electrical load being drawn from the control and distribution module by the access connectors in use at any one time or continuously, and the status of charge (i.e. percentage or amount charged) of each electric vehicle connected to each access connector of the plurality of access connectors. Alternatively, it may send control signals to the control and distribution module, which may be sent on to one or more access connectors of the plurality of access connectors, to control certain charging and/or discharging parameters (for example the magnitude and/or phase of electrical power provided to each access connector, respectively).

In addition, the control and distribution module may be wirelessly connected to a plurality of user interface (UI) devices, wherein a UI device may be any device with which an EV user and/or system customer is able to interact, for example, by viewing data and/or inputting data and/or making decisions. For example, the UI device may be a smart phone or a tablet or a vehicle user interface. The UI device may be a remote UI device, in that it may not be physically linked to the control and distribution module and may be located or moved away from the control and distribution module.

The connection between the control and distribution module and the plurality of UI devices may be direct. Preferably, this connection may be made via the data processing and control centre, such that the control and distribution module may be wirelessly connected to the data processing and control centre, which may be wirelessly connected to the plurality of user interface (UI) devices.

Each UI device may correspond to each EV user and/or system customer connected to the system at any one time. Each UI device may be connected to and disconnected from the system as and when an EV user and/or system customer is connected to the system. New UI devices may also be connected to the system at any time, for example if an EV user decides to connect their electric vehicle to the system. The UI devices may receive data from the system (i.e. from the control and distribution module and/or the data processing and control centre). Alternatively, or in addition, the UI devices may send data and control signals to the control and distribution module (again, preferably via the data processing and control centre). The data and control signals which are sent by the UI devices may be controllable by and based upon the input of an EV user and/or system customer.

Data may be sent from the data processing and control centre to any applicable UI device. A EV user and/or system customer may be able to monitor and control charging and/or discharging parameters from their respective UI device. For example, a user may be able to monitor the current status of charge of their electric vehicle (i.e. the electric vehicle is a certain percentage charged).

Alternatively, or in addition, a user may change and/or control charging parameters and make decisions using their respective UI device. For example, using their UI device a user may select what magnitude and/or phase of electrical power their electric vehicle should be charged at. Decisions made by a user using their respective UI device may be instantaneously processed and actioned by the system.

There may be provided a system for connecting electric vehicles to an electrical network, the system comprising:
a control and distribution module connected to the electrical network;
a plurality of access connectors connected to the control and distribution module to receive power from the electricity network; and
an intermediate connector module,
wherein the intermediate connector module is connected to an electric vehicle and wherein the intermediate connector module is operable to be inserted into any one access connector of the plurality of access connectors to facilitate the connection of the electric vehicle.

There may be provided a method for monitoring and controlling the charging of electric vehicles, the method comprising:
providing a system for connecting electric vehicles to the electrical network comprising:
   a control and distribution module connected to the electricity grid; and
   a plurality of access connectors connected to the control and distribution module via one or more cables providing a power and/or communication transmission line;
   and at least one electric vehicle connected to at least one of the plurality of access connectors
monitoring the load drawn from the control and distribution module;
controlling the electrical power transmission to the at least one of the plurality of access connectors in dependence on at least one of: the identity of a user of the electrical vehicle, and one or more attributes of the user of the electrical vehicle, or the load drawn from the control and distribution module.

The method may comprise monitoring the status of charge (i.e. percentage charged) of the at least one electric vehicle connected to at least one of the plurality of access connectors.

The method may comprise controlling the electrical power transmission to the at least one of the plurality of access connectors in dependence on the status of charge (i.e. percentage charged) of the at least one electric vehicle.

There may be provided a system for connecting electric vehicles to an electrical network, the system comprising:
a control and distribution module connected to the electrical network;
a plurality of access connectors; and
wherein each access connector of the plurality of access connectors is connected to the control and distribution module by a cable, each cable providing a communication transmission line between the control and distribution module and each respective access connector;
wherein the control and distribution module comprises a communications link to at least one remote user interface device.

The communications link may be direct, or may be via the internet or a wireless or mobile communications protocol. Alternatively, or in addition, the communications link may be via a data control and processing centre wherein the data control and processing centre may be linked directly or wirelessly to the control and distribution module and/or the at least one remote user interface device.

There may be provided a system for connecting electric vehicles to an electrical network, the system comprising:
a control and distribution module connected to the electrical network; and
a plurality of access connectors;
wherein each access connector of the plurality of access connectors is connected to the control and distribution module via one or more cables providing a power and/or communication transmission line and is operable to receive electrical power from the electrical network,
and wherein the control and distribution module is configured to verify that a good connection is established between said access connector and an electric vehicle, and enable power transmission to the access connector in dependence on the verification of the good connection.

The system may not enable power transmission to the access connector if a good connection is not verified between said access connector and an electric vehicle.

There may be provided an access connector for accessing an electrical network, wherein the access connector is configured to be installed in roadside infrastructure to be substantially flush with an outer surface of the of the roadside infrastructure, and wherein the access connector provides a mechanical and electrical connection point for an electrical vehicle connector.

BRIEF DESCRIPTION OF THE DRAWINGS

There will now be described, by way of example only, various embodiments of the invention with reference to the drawings, of which.

DETAILED DESCRIPTION OF PREFERRED EMBODIMENTS

Figure 1:
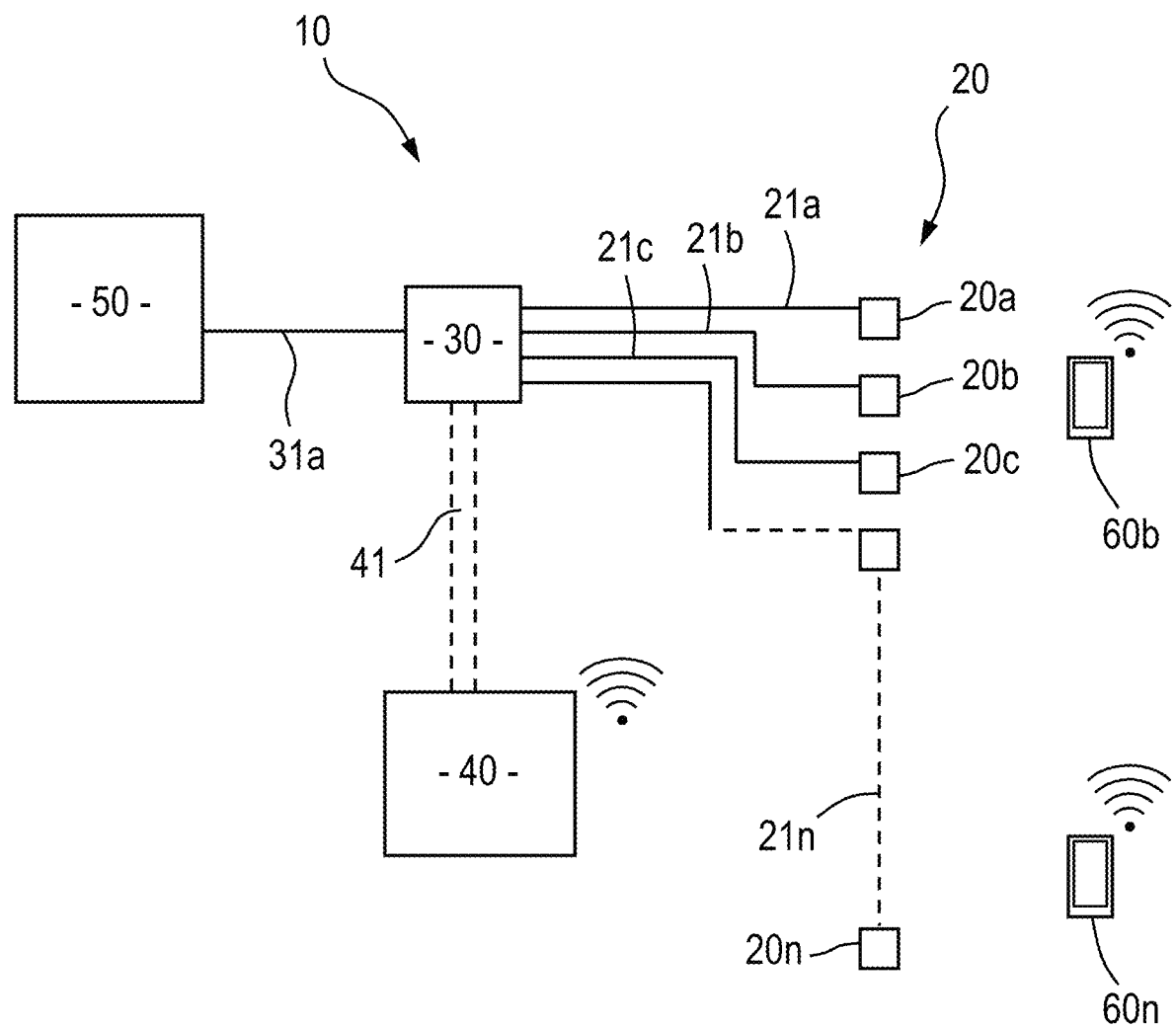
FIG. 1 is a block diagram schematic representation of a system incorporating an access connector apparatus according to an embodiment of the invention.
Figure 2:
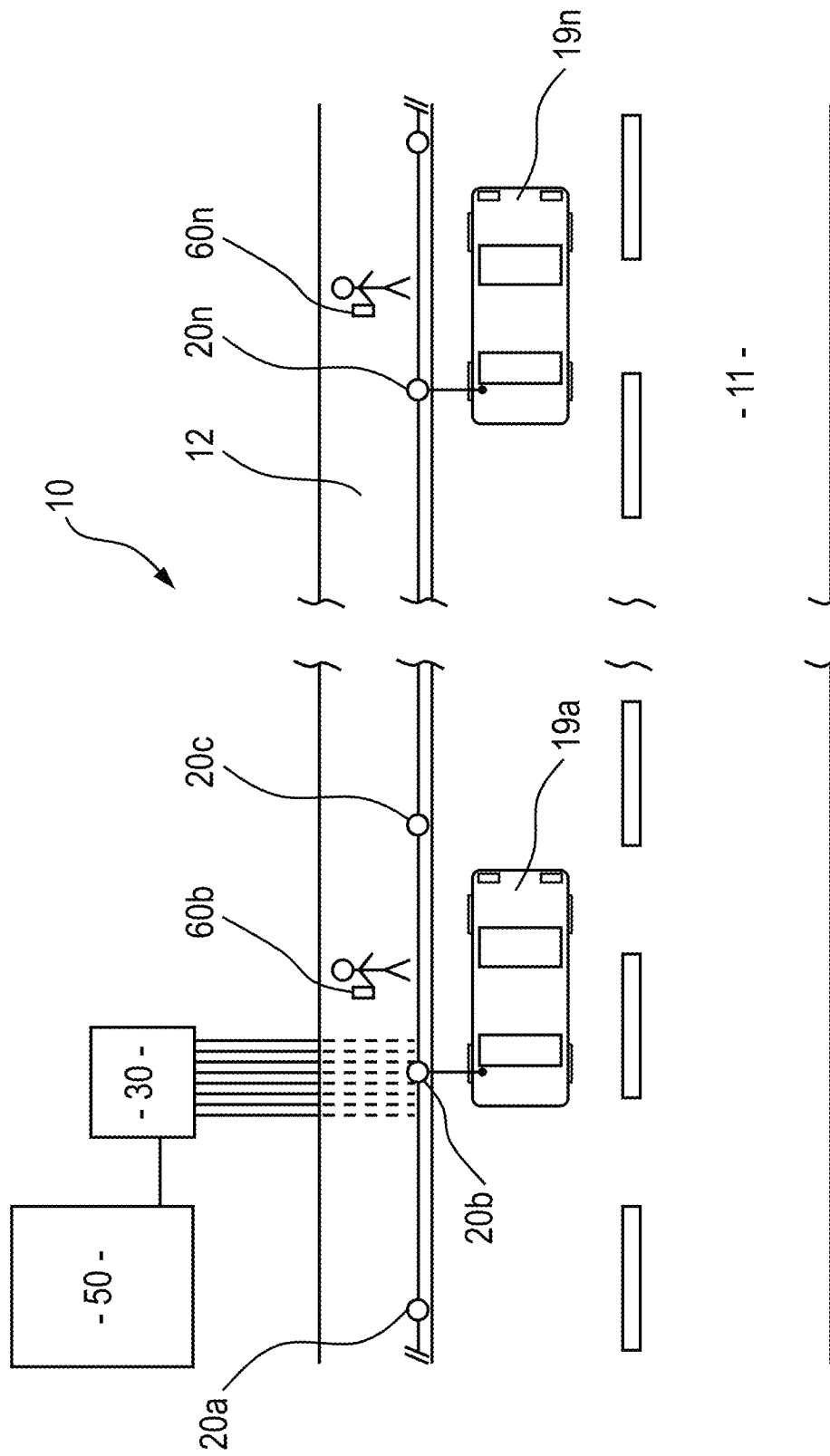
FIG. 2 is a schematic physical representation of the system of FIG. 1.

Referring firstly to FIGS. 1 and 2, there is shown an electrical vehicle connection system incorporating an access connector apparatus according to a first embodiment of the invention. The system, generally depicted at 10, includes a number of access connectors 20a, 20b, 20c to 20n, generally and collectively referred to as 20, and a control and distribution module 30. The control and distribution module 30 is connected to an electrical substation 50 forming part of an electrical grid via power cable 31a, which is operable to transmit electrical power between the substation 50 and the module 30. The local electrical substation 50 functions to step down the electrical supply voltage from a transmission level (e.g. 11 kV or 6.6 kV) to a distribution level (e.g. 415 V, three phase electrical power). However, it will be appreciated that the system can be used in conjunction with substations of various other ratings, at different points in the grid network altogether, or without the provision of a substation where applicable.

Each access connector 20 is connected to the control and distribution module 30 via a respective cable 21a, 21b, 21c to 21n (generally and collectively referred to as 21), which is capable of transmitting electrical power and communications or control data between the module 30 and the access connector. In this embodiment, a dedicated electrical power transmission line and a separate communication transmission line are provided in each cable between each connector 20 and the control and distribution module 30. However, it will be appreciated that one physical transmission line may be used for data and power transmission in alternative embodiments. It will also be appreciated that more than one cable may exist between the control and distribution module 30 and each access connector 20 respectively. The system 10 is able to access electrical power from the electrical grid and transmit this to one or more electric vehicles 22b, 22n via the cables 31a and 21, and the connections made at the access connectors 20. Each access connector apparatus 20 also functions as an access point for electric vehicles to transmit electrical power back to the network. In addition, an access connector apparatus is capable of supplying different phases (i.e. single-phase or three-phase) and/or magnitudes of electrical power to an electric vehicle connected to it.

The access connectors 20 are spatially distributed in the locality of the module 30, and are integrated into the available infrastructure—in this case the pedestrian walkway 12 (or pavement, sidewalk, car park or long-stay car park)—at the side of a vehicle carriageway 11, which in this case is a public road or highway. The locations of the access connectors 20 are such that they are available for use by vehicles parked at the roadside, for example in a residential, retail or business district, for connection to the electrical network. The access connectors 20 are in this example installed at a distance of between 4 and 10 metres between one another, although it will be appreciated that they do not need to be installed at regular intervals. The cables 21 are buried in the ground, in this case running substantially parallel to the roadside under the pedestrian walkway 12. It will also be appreciated that home owners may pay for dedicated access connectors, connected to the wider system, to be installed on their property (for example, in a garage or on a driveway) to provide a private, personal connection point to the system.

Placement of the access connectors adjacent the roadside, ideally within 0.5 m of the roadside, provides a convenient location for vehicle connection with minimal impact on road users. Integration of the connectors with the roadside infrastructure (in this case the pedestrian walkway 12) facilitates installation with minimal disruption to the vehicle carriageway itself.

The control and distribution module 30 provides a local access point for each access connector 20 to access the electrical grid. It also acts as the local control point for the set of local access connectors 20. This is in contrast to the provision of separate distributed control stations for each vehicle connection point, as is conventional. The described configuration is advantageous as the necessary control, metering, switching and safety mechanisms may be provided in one secure module or unit, for a number of local access connectors, which may be spatially displaced over (for example) a number of residential streets without the need for long trailing connection cables. Proposed systems in which a charging station is capable of connecting to more than one electric vehicle require that each vehicle connects into the same station via a cable. Such configurations are limited in their application to more than a few vehicles, and are unsuitable for installation in many business, retail and residential areas.

The system 10 also comprises a remote data processing and control centre 40, in communication with the control and distribution module 30 of the system, linked to the remote data processing and control centre 40 via a communication connection 41. It will be appreciated that the connection 41 may be wired or wireless, and may use any or a wide-range of communications protocols. The remote data processing and control centre 40 receives various data from the control and distribution module 30, including but not limited to the status of the access connectors 20 which are currently in use, the total electrical load being drawn from the control and distribution module 30 and the charging status (e.g. percentage charged) of each electric vehicle connected to each access connector 20. Control signals can then be transmitted from the remote data processing and control centre 40 to the control and distribution module 30 to control certain operational parameters of the system.

The remote data processing and control centre 40 is also linked to a communications network (for example the internet) that enables communication with users through remote user interface (UI) devices 60b, 60n. In this example, the remote UI devices 60b, 60n are mobile telephone handsets connected wirelessly to the internet using mobile network communications protocols. It will be appreciated that other types of remote UI devices may be used, including mobile, desktop, or vehicle-based devices, and/or that wired communications protocols may be used. In particular, the remote data processing and control centre 40 may be connected to a communications network using either wired or cabled, or wireless communications protocols.

The remote UI devices 60b, 60n of this embodiment are smart phones running an application operable to function with the system 10. Data can be sent to and from the remote data processing and control centre 40 and any remote UI device 60 which corresponds to the user of an electric vehicle which may be connected to the system. From the remote UI device, a user is able to monitor and control operational parameters, as will be described in more detail below.

It will be appreciated that although one control and distribution module is shown in the system, in communication with a remote data processing and control centre and being connected to a plurality of access connectors, preferred implementations of the system will have a plurality of control and distribution modules, each serving a respective plurality of access connectors in a particular locality. Multiple control and distribution modules may communicate with the same remote data processing and control centre (and indeed a single remote data processing and control centre may communicate with a large number of control and distribution modules).

Figure 3:
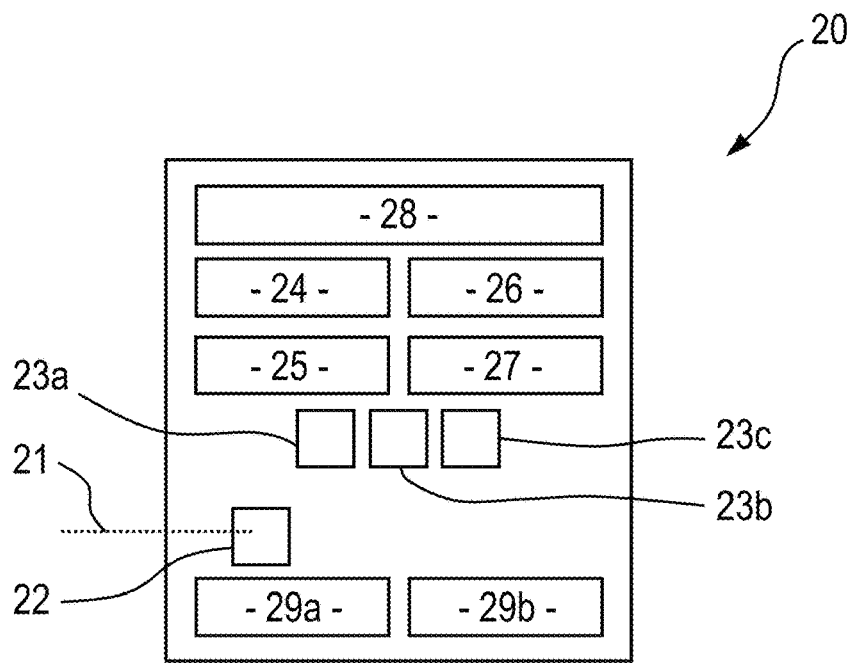
FIG. 3 is a schematic representation of the functional elements of an access connector apparatus in accordance with an embodiment of the invention.
Figure 4:
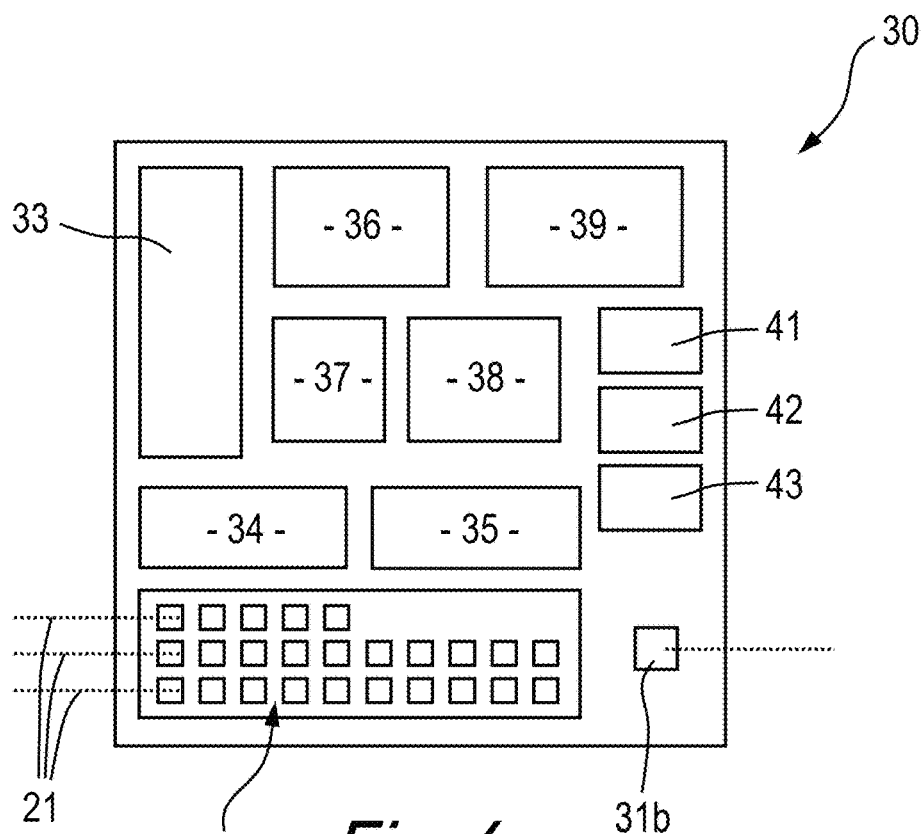
FIG. 4 is a schematic representation of the functional elements of the control and distribution module of FIGS. 1 and 2.

FIG. 3A is a schematic representation of an access connector 20 and its functional elements. The functional elements which are shown and described may each be performed or achieved by separate components of the apparatus. Alternatively, one component may fulfil a number of the required functional elements of the access connector.

The access connector apparatus 20 is configured to be integrated into available infrastructure such as a pedestrian walkway (or pavement, sidewalk, car park or long-stay car park) at the side of a vehicle carriageway, which might be a public road or highway. The selected installation location of the access connector apparatus 20 is such that it is available for use by vehicles parked at the roadside, for example in a residential, retail or business district, for connection to the electrical grid network.

The access connector 20 has an inlet 22 for receiving a cable 21 from the control and distribution module 30. The cable 21 includes a number of dedicated electrical power transmission lines (for example, to provide different phases of electrical power to the access connector) and a communications transmissions line. In this embodiment, the communications transmissions line is also capable of providing instrumentation voltage power for functional elements of the access connector 20. These include a locking member 24 and a locking mechanism 26 for control of the physical connection and disconnection to the connector 20; a trace heating element 27 for frost protection and moisture removal; and visual indicators 28 indicating the operational status of the connector. In some embodiments, the communications line may comprise a conventional Power Over Ethernet line or a functionally similar line. The cable 21 connects the access connector apparatus 20 to the electric grid, providing it with electrical power. The access connector apparatus 20 therefore functions as an access point for electric vehicles to access to the electric grid.

The power transmission lines of the cable, which carry the electrical power for charging an electric vehicle, are coupled to electrically conductive contactors within the access connector apparatus, shown generally as 23a, 23b and 23c. Contactors 23a, 23b and 23c are designed to connect with the corresponding contactors of a corresponding connector interface of a compatible connector, which is connected directly or indirectly to an electric vehicle.

The access connector 20 also comprises an arrangement of seals 25 to prevent the ingress of moisture and particulates, and drain and valve elements 29a, 29b respectively, to remove moisture and to avoid the build-up of pressure. It will be appreciated that these features are optional.

Referring now to FIG. 3B, there is shown a block diagram schematic representation of the control and distribution module 30 and its functional elements. The control and distribution module 30 has an inlet connection 31b for receiving a power cable from the electrical substation (not shown). It also has an inlet for a bundle of cables and a corresponding number of connection points, shown generally and collectively at 32, for cables of each access connector. Each connection point 32 comprises contact elements and appropriate switchgear for the transmission of every phase of power (i.e. single phase or three phases) to the access connector, as well as contact elements for the transmission of the power required for other functions (such as trace heating in the access connector) and contact elements for the transmission of data, control and communication signals to each access connector. Switchgear for each connection point 32 is also provided to facilitate the transmission of and switching between different phases of power to each access connector.

The control and distribution module 30 is provided with a residual current device (RCD) and fault sensing element 37 to protect users, the general public and the system from harm or damage, should an electrical fault occur.

A metering module 36 is included in the control and distribution module 30 to provide metering for each access connector coupled to the module 30. In addition, the module 30 has a current and load sensing element 38 which is capable of monitoring the load being drawn from the control and distribution module 30, from any one individual access connector, or from some or all of them collectively.

The control and distribution module 30 has a communications module 33 for processing, sending and receiving data, control and communication signals to the remote data processing and control centre (and hence the remote UI devices); the access connectors and to the electric vehicles coupled into the system, respectively.

The control and distribution module 30 also comprises an ambient temperature sensor 34. This sensor 34 is used to decide when the trace heating within the access connectors connected to the module 30 is actuated. Alternatively, the trace heating within the connectors may be actuated automatically or by operator intervention if it is deemed likely that the connectors have been exposed to moisture, for example, as the consequence of a flooding event. A signal would be sent to the module 30 via the remote data processing and control centre 40 to control the trace heating in this way.

The module 30 also comprises a processing module 35 for processing received data and controlling communication signals to and from each access connector and the remote data processing and control centre.

Optional additional functional elements in the module 30 include a visual display screen 39, a transformer 41, a rectifier 42 and an inverter 43.

From the control and distribution module 30, each access connector can be controlled and monitored individually or as a collective, as will be described in more detail below.

Figure 5:
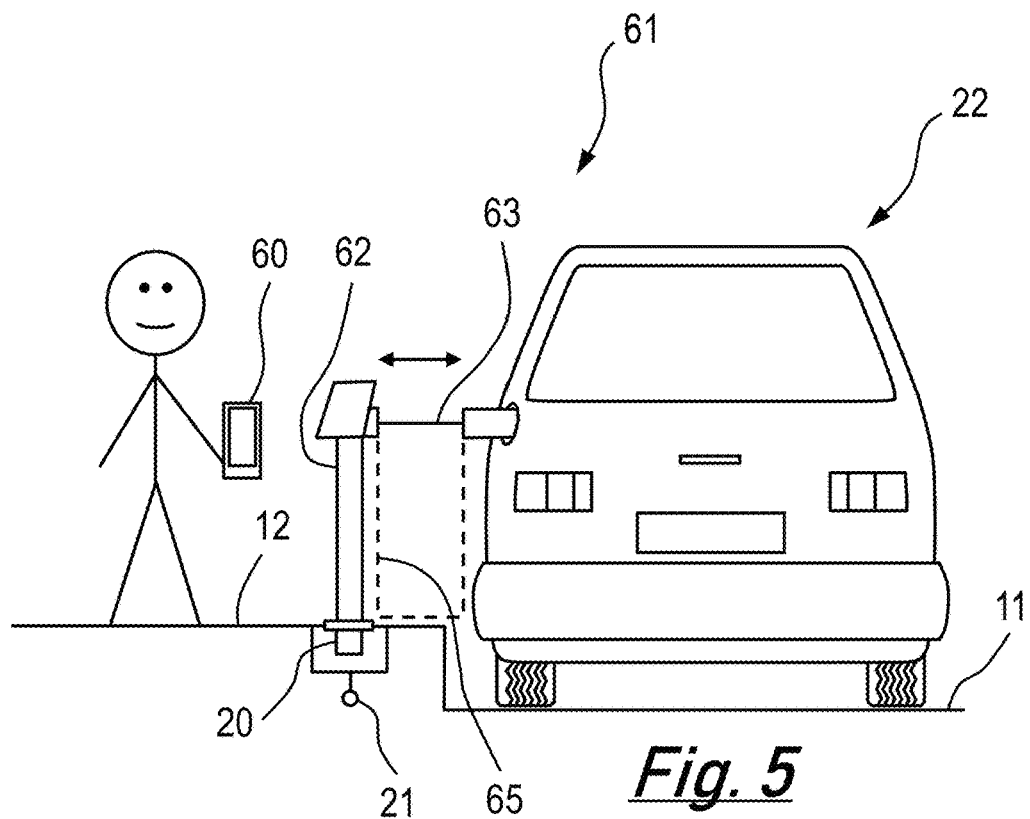
FIG. 5 is a schematic physical representation of a connection system incorporating an access connector apparatus according to an embodiment of the invention, using an intermediate connector module.
Figure 6:
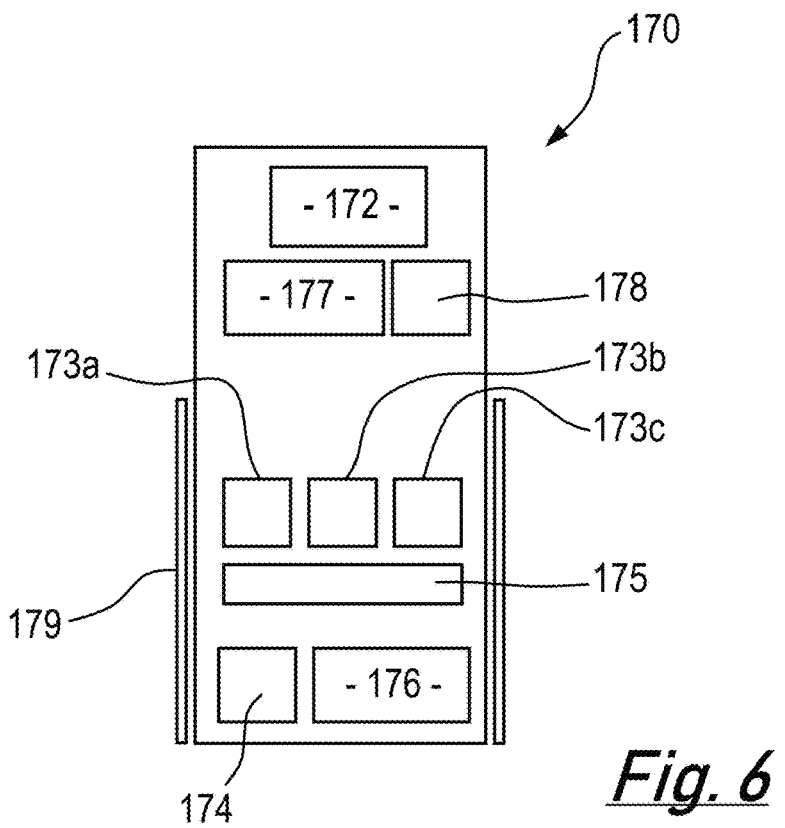
FIG. 6 is a schematic representation of the functional elements of the intermediate connector module of the system of FIG. 5.

FIGS. 5 and 6 illustrate a vehicle connection subsystem used with the system 10 in accordance with a preferred embodiment of the invention. The subsystem, generally shown at 61, comprises an intermediate connector module 62, which is used to connect the access connector 20 to an electric vehicle 22 via a vehicle cable 63. The access connector 20, in the manner shown in FIGS. 1 and 2, is located in a pedestrian walkway 12, adjacent a side of a vehicle carriageway 11.

The intermediate connector module 62 is in the form of a rod or lance, operable to be connected to the access connector 20 at a first end, and operable to be connected to a vehicle cable 63 at a second end. The intermediate connector module 62 is a portable unit which, when not in use, may be carried in the electric vehicle 22. The first end of the connector module is designed to securely, easily, and reliably connect to the access connector 20. The second end is designed to be connected to a standard electric vehicle cable connector, which is in turn connected to a connector on the vehicle. The cable and vehicle connectors may for example be industry standard "type 2" connectors. However, in this embodiment, the connector module-to-cable connector comprises a safe breakaway connection, which is configured to separate safely on application of sufficient force in order to protect the vehicle 22, the cable 63, the module 62 and the access connector 20 from damage (for example, if the parked vehicle is involved in a collision).

In this embodiment, the cable is shown as passing substantially directly from the second (upper) end of the lance to the vehicle. This is facilitated by the length of the lance functioning to raise the cable connection point to a suitable height, approximately equal to a height of the vehicle connector. Intermediate connector modules may be provided in a range of different heights depending on the vehicle or vehicles with which it will be used. Alternatively, or in addition, the intermediate connector modules of some embodiments of the invention may be extendable in length to cover a range of connector heights. Alternatively, a longer cable can be used and can be routed down to the access connector location, across the gap between the access connector and the vehicle position, and up to the vehicle connector, as shown by the dotted line 65. It will be appreciated that there are various other suitable ways in which the module 63 can be connected to the electric vehicle 22.

FIG. 6, is schematic representation the functional elements of an intermediate connector module 62 in the form of a rod or lance 170. The module 170 comprises a number of electrically conductive contacts 173A, 173B and 173C, which are positioned on the outer surface of the lance. Three contactors have been shown to indicate separate transmission points for each phase of power, and are arranged to abut corresponding contact of an access connector when connected. The lance also comprises a cable connected 172 through which power and data/communication signals can be transmitted between the electric vehicle and the lance.

The lance 170 has an illumination source 174 which is operable by the user and facilitates visual alignment of the lance and an access connector during insertion in low light conditions or darkness. The illumination source 174 is powered by an instrumentation voltage line from the control and distribution module (e.g. the communications line). Alternatively, or in addition, the lance may be provided with a rechargeable or non-rechargeable battery (not shown).

The lance 170 also comprises an opening mechanism 176, a locking component 175 and a releasing mechanism 177. The opening mechanism 176 comprises an RFID device operable to actuate the locking mechanism of an access connector in the near vicinity of the lance, to unlock the access connector and enable insertion of the lance 170 into the access connector. The locking component 175 is arranged to be engaged by the locking mechanism of the access connector to secure the lance to the access connector. The releasing mechanism 177 is operable to disengage the locking mechanism of the access connector when the lance is to be released.

A processing module 178 is provided in the lance for processing received data and controlling communication signals to and from the control and distribution module and the electric vehicle.

The lance 170 may also optionally comprise a retractable sleeve 179, to provide it with additional protection from the weather, dirt, and debris. When the lance is not in use, the sleeve 179 is extended over the functional section of the lance (i.e. the section containing the electrical contact elements 173), and when the lance is inserted into an access connector, sleeve 179 is retracted.

The use of an intermediate charging module is advantageous, as it renders at least part of the electric vehicle connection system portable, and simplifies the infrastructure that is necessary to install (permanently or semi-permanently) in the connection location. The access connector can be made simple, unobtrusive and relatively low cost, compared with a conventional charging station. Other functional elements conventionally found in a charging station are incorporated into the intermediate charging module, carried by the user in the vehicle, rather than installed at the connection location. This facilitates the installation of access connectors (and therefore charging points) in a wide range of locations, including but not limited to residential, business, and retail areas, including car parks, with flexible distribution arrangements at relatively low cost.

The intermediate connector module is removed from the access connector when not in use, reducing visual impact at the connection location, and reducing risk of damage to expensive connection infrastructure. The intermediate connector module is replaceable at relatively low cost in the event that it is damaged, and the impact of damage is only to the vehicle user; the access connector is relatively robust and can be used by other vehicle users having their own intermediate connector modules.

Figure 7A:
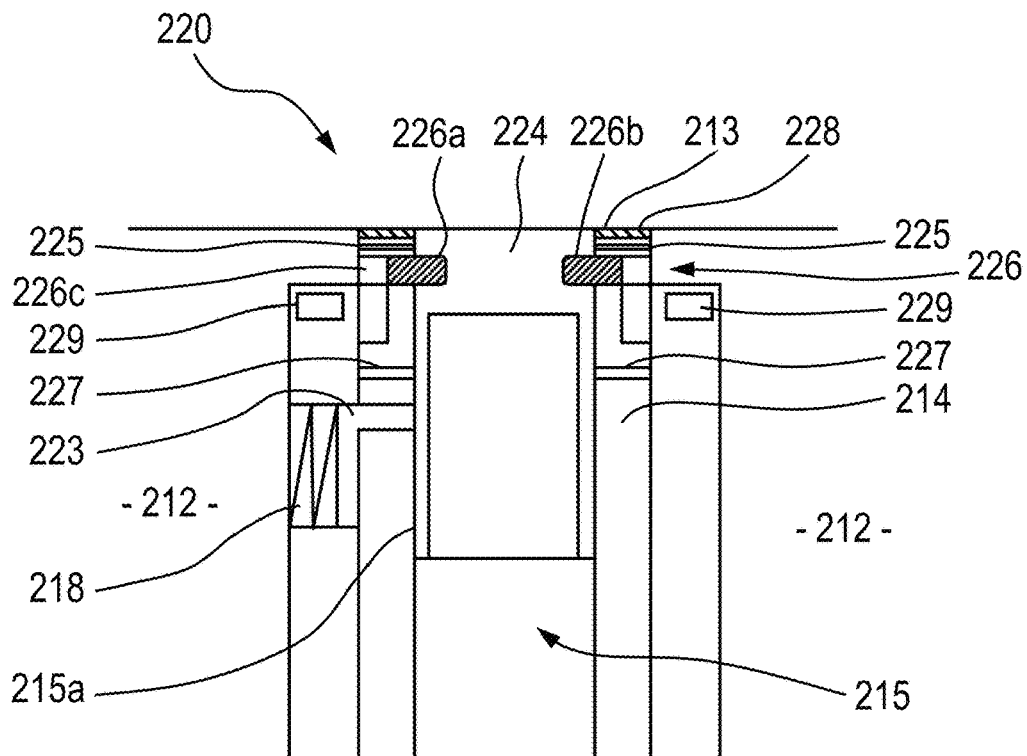
FIGS. 7A and 7B are sectional views of an access connector apparatus according to an embodiment of the invention, in locked and unlocked positions respectively.
Figure 7B:
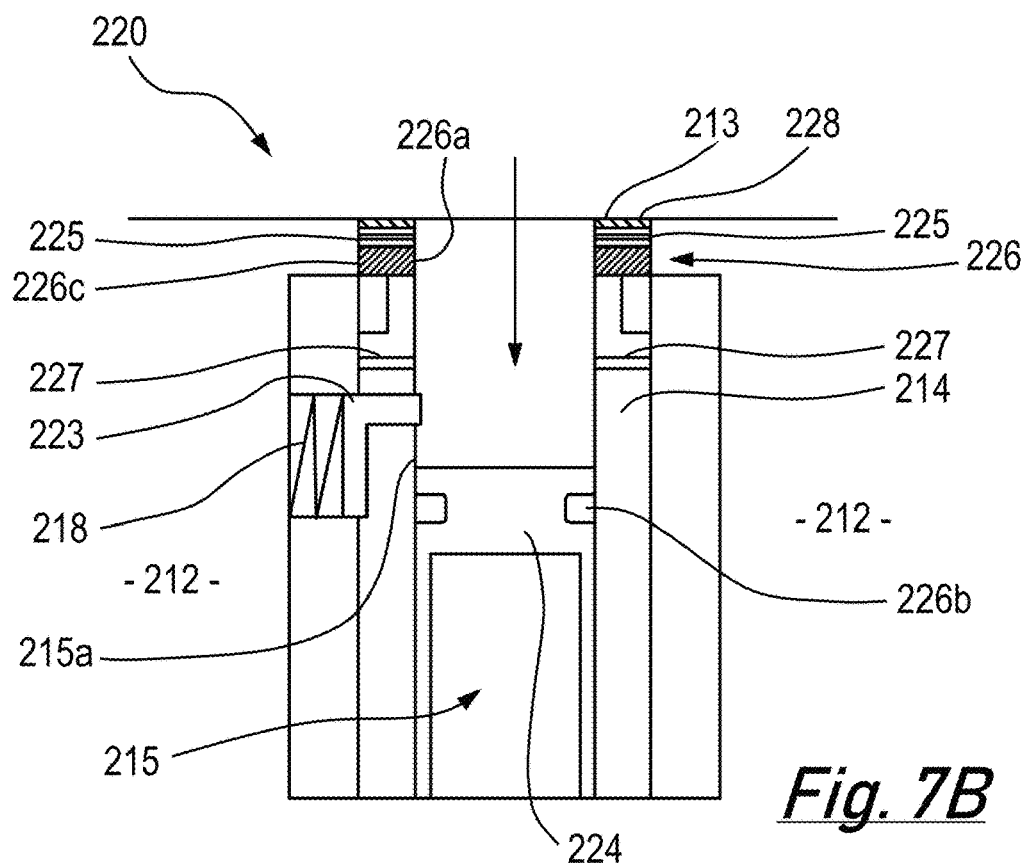
Figure 8:
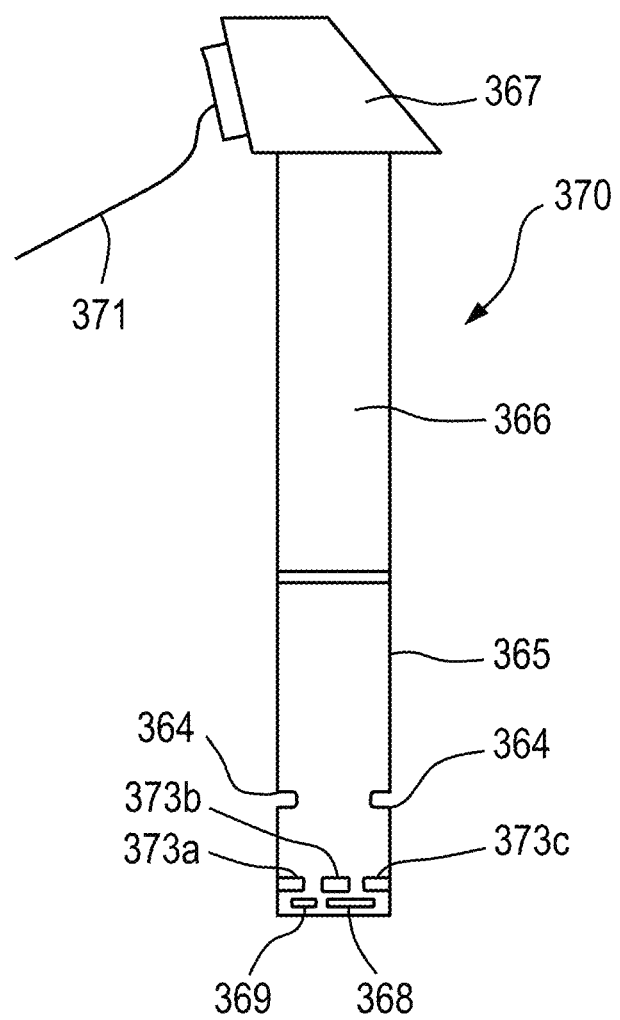
FIG. 8 is a side view of an intermediate connector module suitable for use with the access connector of FIGS. 7A and 7B.

FIGS. 7A, 7B and 8 illustrate an access connector system according to a preferred embodiment of the invention. FIGS. 7A and 7B are sectional views of an access connector, in closed and open positions respectively; FIG. 8 is a side view of an intermediate connector module suitable for use with the access connector of FIGS. 7A and 7B.

The access connector, generally shown at 220, is similar to the access connector 20, with similar functional elements and will be understood from FIGS. 1 to 6 and the accompanying description, with like features labelled with like reference numerals incremented by 200.

FIG. 7A shows the access connector 220, in its first, closed (i.e. locked) condition and FIG. 7B shows the access connector 220 in its second, open (i.e. unlocked) condition.

The access connector is installed in the ground at a side of a vehicle carriageway, in a pedestrian walkway (in this case, a pavement 212). The top 213 of the access connector 220 is substantially flush with the surface of the pavement 212, to minimise protrusion from the surface of the pavement, and minimise a recess which would otherwise tend to collect moisture and/or debris. The connector 220 generally comprises a hollow cylindrical body portion 214 and a main bore 215 for the insertion of a corresponding connector. In this case, the corresponding connector is the intermediate connector module shown in FIG. 8. A locking member in the form of a plug 224 sits within bore 215. The plug 224 is sprung (spring not shown) such that it is biased into an upward position shown in FIG. 7A, in which the top of the plug 224 lies substantially flush with the top of the access connector 220 and the pavement. The plug fills the volume defined by the body, such that when the plug 224 is in the position shown in FIG. 7A, protrusion from the surface of the pavement is minimised or avoided, and there is substantially no recess which would otherwise tend to collect moisture and/or debris.

The plug 224 is locked in place by a locking mechanism, shown generally at 226. The locking mechanism 226 comprises a set of annular locking dogs 226a engaging a recess 226b on the plug 224. The locking dogs 226a are housed in an annular recess 226c in the body of 214 of the access connector 220. The locking dogs 226a are operable to move between a position in which they extend radially inward (i.e. a locking position) and a position in which they are retracted into recess 226c (an unlocked position). The locking mechanism 226 of this embodiment comprises a solenoid to control the movement of the dogs 226a, with power provided by the control and distribution module. In alternative embodiments, the locking mechanism 226 may be actuated to lock and unlock in other ways, for example by an electric motor, or a manually actuated key. Upper seals 225 seal against ingress of fluid between the plug and the connector body.

The connector comprises an RFID reader 229 which is configured to detect the presence of a compatible connector or connector module and selectively operate the locking mechanism 226 to engage or disengage.

When the locking mechanism 226 is disengaged, downward movement of the plug 224 within the bore 215 of the connector 220 is enabled. FIG. 7B shows the access connector 220 in its second, open condition with plug 224 being subjected to a substantially downward force (indicated generally by the arrow). In use, this downward force will come from the insertion of an intermediate connector module, shown generally at 370 in FIG. 8, providing that the mechanism has been unlocked.

The access connector 220 also comprises a number of electrically conductive contact elements 223. For simplicity, only one contact element 223 has been shown, although three are provided. It will be appreciated that a greater or lesser number of contact elements may be used in alternative embodiments. The contactor elements 223 are connected to the power and communication transmission lines of the cable 21 which runs to the access connector 220 from the control and distribution module. The number and the position of contact elements 223 in the access connector will correspond to the number and position of contact elements on the intermediate connector module 370. The contactor elements 223 are positioned on the inner wall 215a of the bore 215, with their surfaces substantially vertically oriented.

The access connector contact elements 223 are biased to slightly protrude radially into the bore 215 of the access connector 220. When the plug is in its locked position, the contact elements 223 are pushed back by the plug 224 into the recess 218 in the body 214 of the access connector 220, as can be seen in FIG. 7A. When the plug is pushed down into the body (i.e. by an inserted intermediate connector module) the contactor elements 223 move radially inwards into recess 215 of the access connector 220, as can be seen in FIG. 7B.

The access connector 220 includes a visual status display arrangement, which in this case is an arrangement of coloured LEDs 228 arranged on the upper surface, around the bore 215. The coloured LEDs provide a visual indication of the status of the connector 220, as will be described in more detail below. A trace heating ring 227 is positioned around the bore 215 of the connector. At its base, drains (not shown) are optionally provided to facilitate removal of any moisture that does make its way into the connector. Vents and/or valves (not shown) may also be positioned in this region to mitigate the likelihood of pressure build-up, and/or to facilitate discharge of moisture or vapour from the connector bore.

FIG. 8 shows an intermediate connector module in the form of a lance 370 from a side view. The lance 370 comprises a first, lower end with a lower connector 365 corresponding to the access connector 220. A shaft 366 extends to an upper end comprising a handle 367 and a cable connector for cable 371.

The lower connector 365 comprises a substantially cylindrical body with a locking formation component in the form of an annular recess 364. The shape and position of the recess 364 corresponds to the shape and position of the locking mechanism 226 of the access connector 220, such that the lance 370 can be locked into engagement with the access connector by the locking mechanism 226. The lance 370 also has a number of contact elements 373a, 373b, 373c on its outer surface, which correspond to the positions of the contact elements in the access connector. The lance and the access connector are both shaped in such a way to provide a guiding profile, so that the lance can only be fully inserted into the access connector in one particular azimuthal or rotational orientation, such that their respective corresponding contact elements are matched with one another.

At its base, the lance 370 has an RFID chip 368 which is operable to disengage the locking mechanism of the access connector to unlock the plug and thus open the access connector.

The lance 370 also has a light source 369 at its base which may be operated by the user using a switch (not shown) positioned on the uppermost section of the lance, the shaft 366 or the handle 367. The light source 369 is powered separately using batteries so that it can be operated when the lance 370 is not connected to an external power source.

The shaft 366 increases the height of the top of the lance 370 and the cable connector. The shaft 366 can be of various lengths, but in preferred embodiments raises the height of the cable connector approximately equal to a height of a vehicle connector. The shaft 366 and the connector 365 of the lance 370 can be connected to each other in any of a number of ways, for example via a screw threaded connection, and may be interchangeable so that the lance height can be set for a particular user or vehicle. The cable 371 is connected to the connector 365 via electrically conductive components extending along the length of the shaft.

The cable 371 is detachable from the lance via the connector, and as such the lance may be used with standard cables and connectors, which are not necessarily configured for direct interaction with the access connectors. This facilitates retro-fitting and/or backwards compatibility with a wide range of electric vehicles and/or proprietary vehicle connection systems in the market.

Figure 9A:
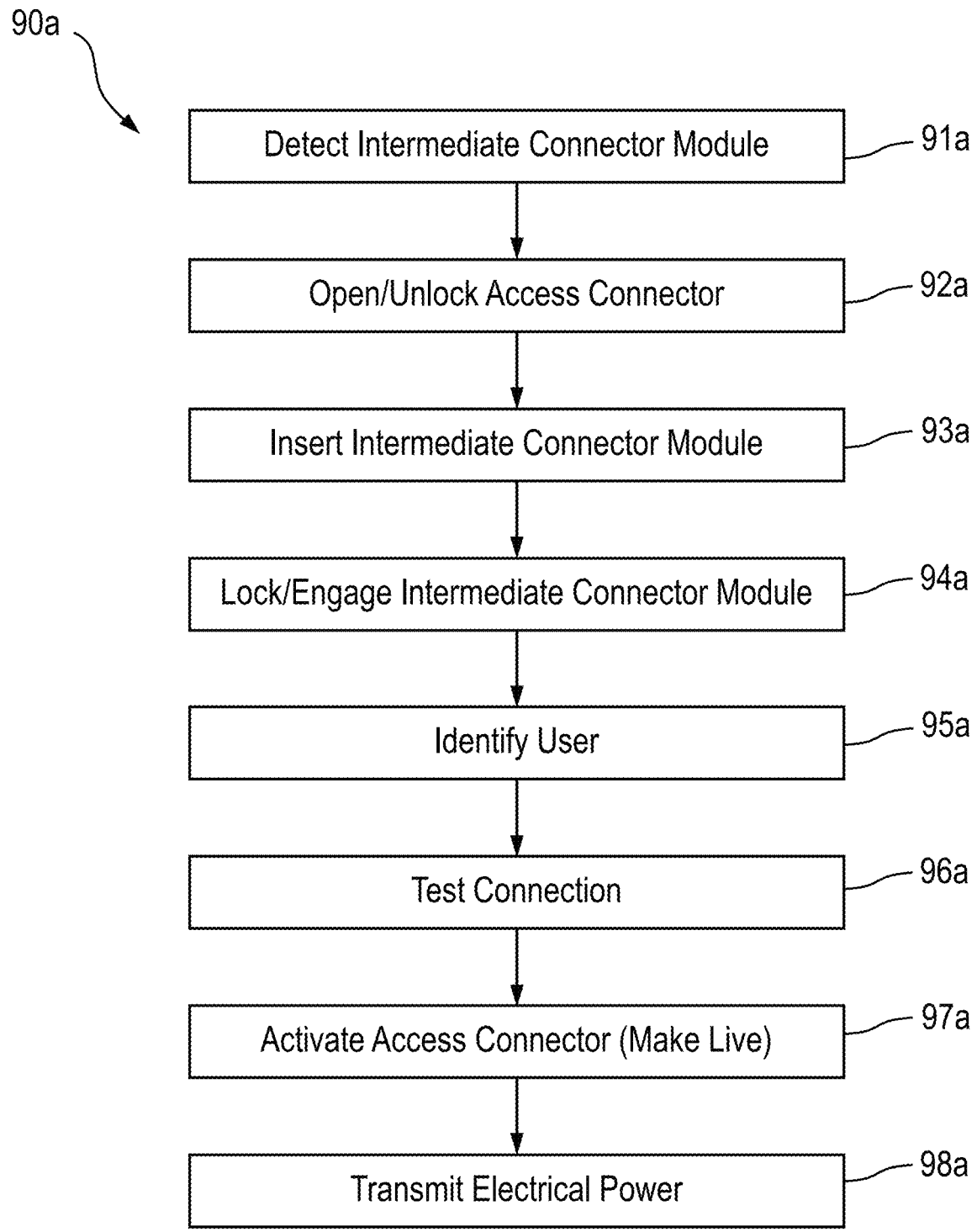
FIGS. 9A and 9B are block diagrams representing a method of charging an electric vehicle and a method of disconnecting an electric vehicle from the system, respectively.

A method of use of the electric vehicle connection system will now be described with reference to FIG. 9A of the drawings, which is a flow diagram illustrating steps of a method 90a of charging an electric vehicle in accordance with an embodiment of the invention.

Prior to the method steps shown, an electric vehicle is parked adjacent to an access connector (such as the connector 220), and the user of the electric vehicle removes an intermediate connector module (such as a lance 370) from the vehicle. The vehicle cable is connected to the intermediate connector module and the vehicle. The first, lower end of the intermediate connector module is brought into close proximity with the access connector (optionally assisted by a light source 369). The status of the access connector is indicated to the user by the visual indicators in the form of coloured LEDs 228. For example, the coloured LEDs may display red when the access connector is faulty and/or out of service, green when the access connector is in use (i.e. a good connection to an electric vehicle has been established) and blue when the access connector is available for use.

The access connector 220 detects the presence of the lance 370 (step 91a) by the detection of the RFID chip 368 of the lance by the RFID reader 229 of the access connector. If the lance 370 is confirmed as being a compatible connector, and the access connector is available for use, the locking mechanism is disengaged to unlock the plug (step 92a). The unlocked status can optionally be indicated to the user, for example by a change in status of the visual indicators (such as flashing LEDs).

In the foregoing description, this is described as being done through corresponding RFID elements installed in both the access connector and the intermediate connector module (i.e. an RFID chip in the intermediate connector module and an RFID reader in the access connector). Although it will be appreciated that the access connector may detect the intermediate connector module in any other suitable manner.

With the plug of the access connector now unlocked, the user of the electric vehicle inserts the lance into the access connector, pushing the plug downwards into the bore of the access connector while doing so (step 93a). The lance and the access connector are both shaped in such a way to provide a guiding profile, so that the lance can only be fully inserted into the access connector in one particular azimuthal or rotational orientation, such that their respective corresponding contact elements are positionally matched with one another and the contacts are brought together.

The locking mechanism of the access connector is then actuated to lock the lance in place (step 94a).

The locking mechanism of the access connector may be actuated to lock the lance in place by any suitable means or protocol. For example, two protocols will be described: a "timing" protocol, and a "proximity" protocol. Under the "timing" protocol, the access connector is unlocked (steps 91a and 92a), and remains unlocked for a certain amount of time, before it "times out" and re-locks itself. The amount of time that the access connector remains unlocked is selected to be sufficient to allow the user to insert the lance into the access connector. Alternatively, under the "proximity" protocol, the access connector and the lance are each be provided with proximity sensors operable to identify whether the lance has or has not been inserted into the access connector. The access connector uses this information to hold itself in an unlocked state until insertion of the lance is actioned, and to actuate locking of the lance after its insertion into the access connector.

The user of the electric vehicle identifies his or herself to the system via their remote UI device (step 95a), for example by a mobile data communication link with the remote data processing and control centre 40. Alternatively, or in addition, user identification can be transmitted directly from an identification code of the lance 370 via the communication line in the cable from the access connector 220 to the control and distribution module 30; from an identification code of the vehicle from the vehicle the communication line in the cable from the access connector 220 to the control and distribution module 30; or by local communication from the user's remote UI device to the lance, and onwards via the communication line in the cable from the access connector 220 to the control and distribution module 30. A combination of communication methods may be used, including those which use multiple identification codes from different elements of the system for checking and/or security purposes.

With the user identified, the connection made between the control and distribution module, the lance, and the vehicle, is tested (step 96a) to ensure that the electrical connection is effective, secure, and safe. A status check of the vehicle battery may also be performed.

When a good connection has been established between the electric vehicle and the access connector via the lance, the control and distribution module actuates switch gear at its connection points to enable transmission of electrical power to the access connector (step 97a). The cable to the access connector is therefore made live. Prior to the tests at step 96a, the cable between the control and distribution module 30 is open for communications or low level power transmission (for the functional elements of the access connector and/or lance) only, and therefore does not present an electrical power risk.

Electrical power can be transmitted (step 98) to the electric vehicle according to predetermined or user-specific settings, managed by the user and/or via the control and distribution module or remote data processing and control centre according to resources available to the system. This will be described in more detail below.

It will be appreciated that the steps of the method 90a can be carried out in sequences other than that presented above. For example, the user may identify themselves to the system prior to any connection being made (in particular, where this is done via their remote UI device).

Figure 9B:
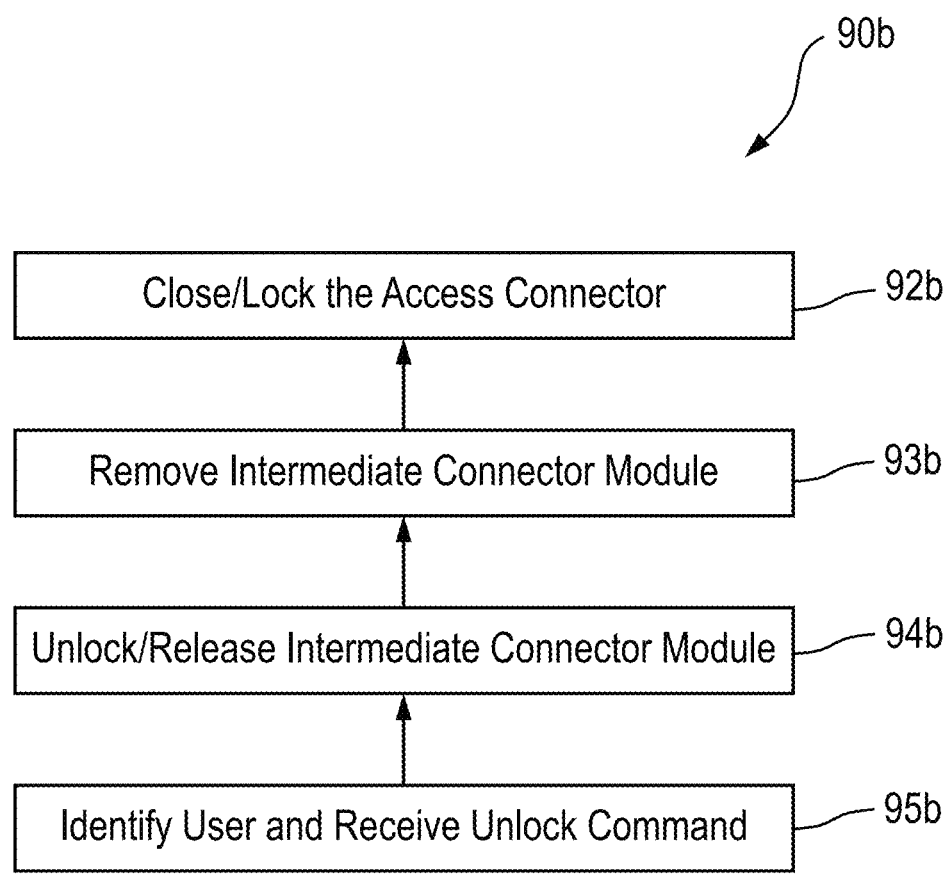
Figure 10:
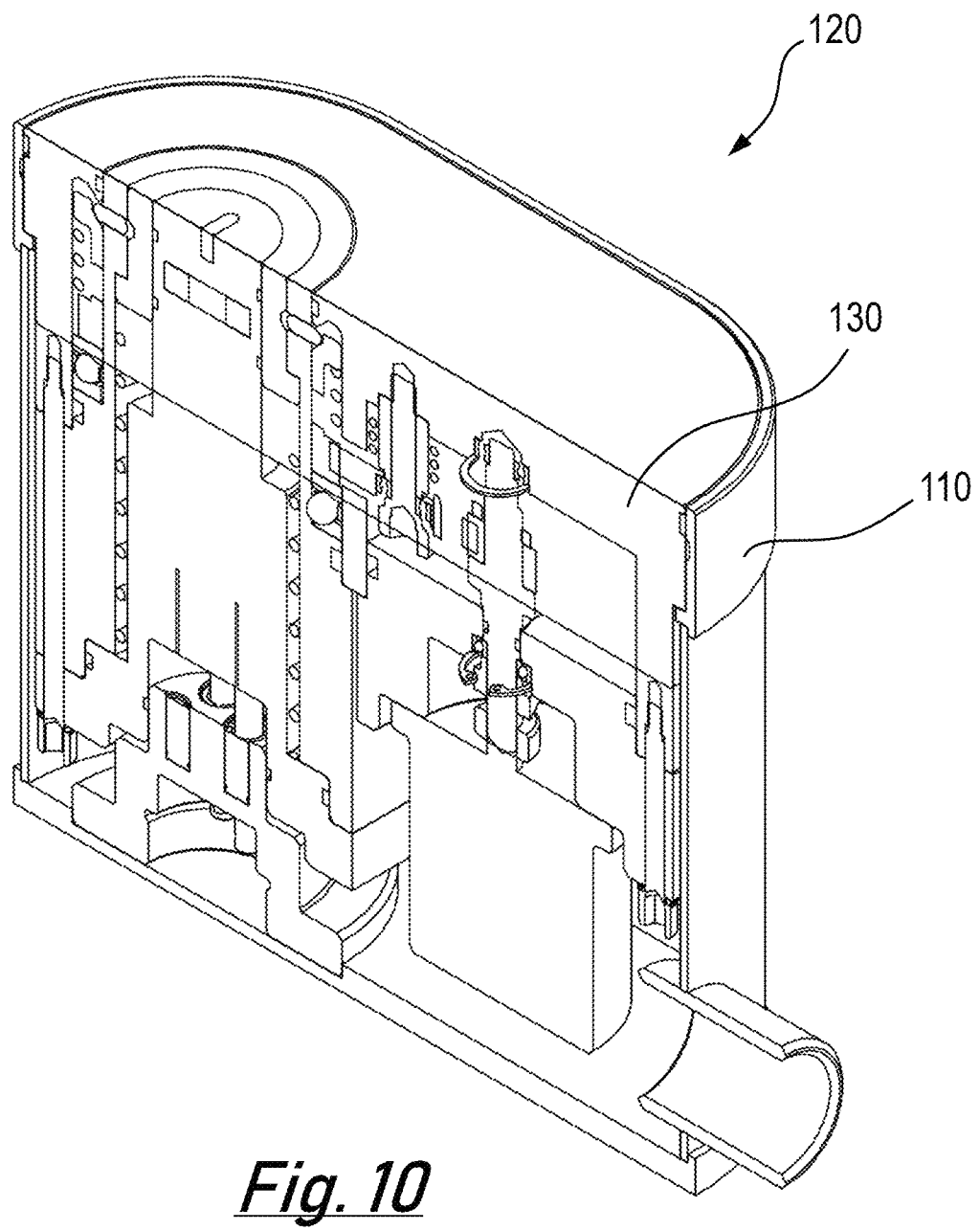
FIG. 10 is a perspective, sectional view of an access connector apparatus in accordance with an alternative embodiment of the invention, installed within a housing.
Figure 11A:
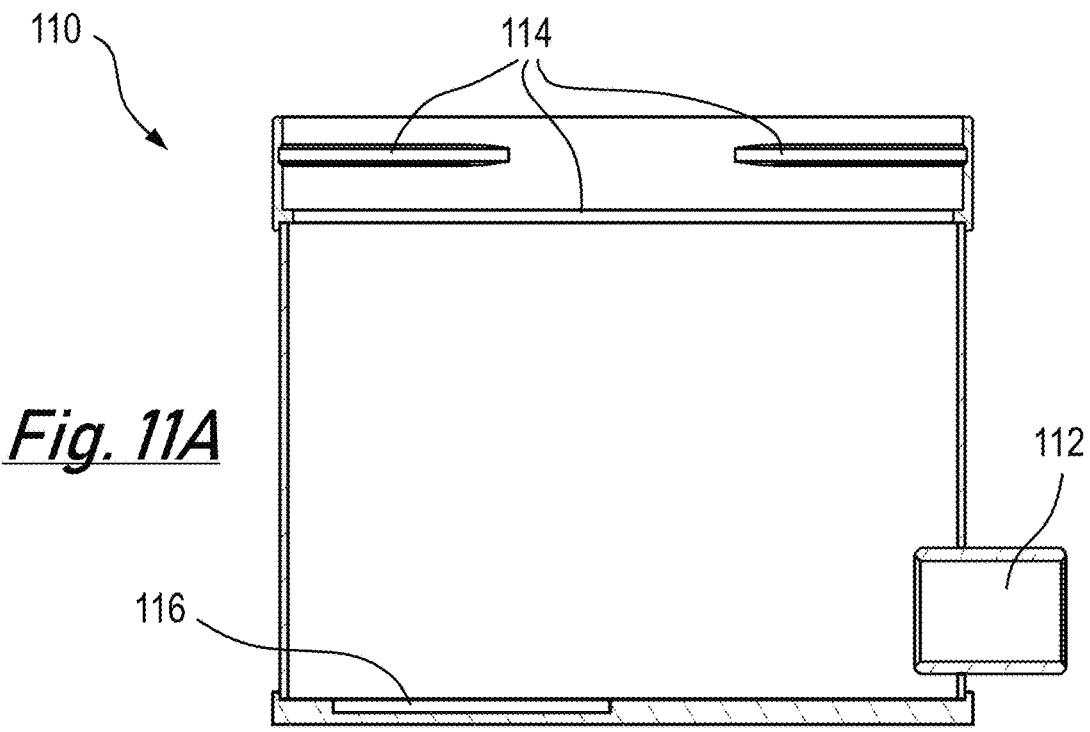
FIGS. 11A and 11B are side and perspective sectional views, respectively, of the housing of FIG. 10.
Figure 11B:
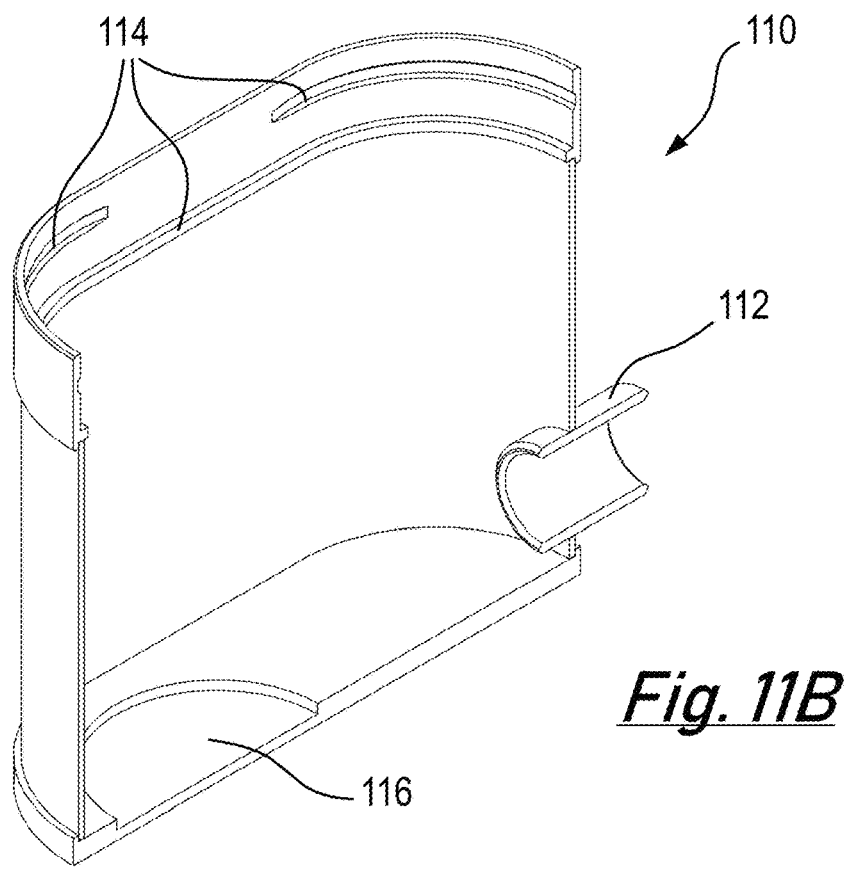

FIG. 9B is a flow diagram illustrating steps of a method 90b of disconnecting an electric vehicle in accordance with an embodiment of the invention. The method steps are substantially similar to a number of the steps of the method 90a, in reverse order.

When the user of an electric vehicle wants to disconnect their vehicle from the system (for example, after charging), the user of the electric vehicle identifies his or herself to the system, and instructs the access connector to unlock and release the lance (step 95b), for example via their remote UI device over a mobile data communication link with the remote data processing and control centre 40. Alternatively, or in addition, user identification and the releasing command can be transmitted directly from an identification code of the lance 370 via the communication line in the cable from the access connector 220 to the control and distribution module 30; from an identification code of the vehicle from the vehicle the communication line in the cable from the access connector 220 to the control and distribution module 30; or by local communication from the user's remote UI device to the lance, and onwards via the communication line in the cable from the access connector 220 to the control and distribution module 30. A combination of communication methods may be used, including those which use multiple identification codes from different elements of the system for checking and/or security purposes. Alternative and/or additional releasing mechanisms, to instruct or cause the access connector to unlock include: a key which corresponds to a lock on the access connector; an RFID chip which corresponds to the RFID reader provided on the access connector; and a PIN pad installed on the access connector which actuates the locking mechanism to unlock when a unique PIN is keyed in.

The locking mechanism of the access connector is then actuated to unlock the lance (step 94b).

With the lance now unlocked, the user of the electric vehicle removes the lance from the access connector by pulling from the connector. Whilst doing so, the plug of the access connector moves upwards into its original position (step 93b).

The locking mechanism of the access connector is then actuated to lock the plug in place, and thus lock the connector, by any suitable means or protocol (step 92b). For example, the access connector may lock the plug in place once a certain amount of time has passed after the active connection to the lance has been broken, or only once it has been identified—using proximity sensors—that the lance has been fully removed from the connector.

The locked status can optionally be indicated to the user, for example by a change in status of the visual indicators (such as LEDs).

An access connector system according to alternative embodiment of the invention will now be described with reference to FIGS. 10 to 15B. The access connector, generally depicted at 120, comprises a body portion 130 that is substantially stadium-shaped in plan view, to form a stadium-shaped cylindrical volume installed in a substantially stadium-shaped hollow housing 110. The protective housing is shown in isolation in FIGS. 11A and 11B, and has a cylindrical inlet 112 positioned close to its base, whose axis is perpendicular to that of the main housing. The inlet 112 is an inlet for cabling to reach the access connector apparatus when it is installed within the housing 110.

The housing 110 further comprises a number of slots and projections 114 about its top inner surface, to accommodate and support the access connector, when installed. In addition, the housing 110 has a circular slot 116 on its base. Again, this is to accommodate a cable termination component of the access connector apparatus (not shown), which will be described in the following description. The body portion 130 is formed by a casting process, e.g. from stainless steel, and functions to retain the various different parts of the connector apparatus 120 in their correct locations. The body portion 130 is attached to various components of the connector apparatus 120 by bolts 131.

The access connector apparatus 120 and the protective housing are installed in the ground at a side of a vehicle carriageway, in a pedestrian walkway (not shown) such that the top 132 of the access connector 120 is substantially flush with the surface of the pavement, to minimise protrusion from the surface of the pavement, and minimise a recess which would otherwise tend to collect moisture and/or debris.

The connector apparatus 120 generally defines an annular bore 134, for the insertion of a corresponding compatible connector which is attached by appropriate means to an electric vehicle. The compatible connector and the access connector apparatus are both shaped in such a way to provide a guiding profile, so that the compatible connector can only be fully inserted into the access connector apparatus in one particular azimuthal or rotational orientation, such that their respective corresponding contact elements are matched with one another. For example, the compatible connector may be provided with a projection which corresponds to a slot in the body of the connector apparatus.

The annular bore 134 surrounds an upstanding cylindrical portion of the connector apparatus 136, the outer walls of which comprise electrical contacts, which face outwardly, towards the annular bore 134. It is by this manner that an electric vehicle is connected to the connector apparatus 120 to gain access to the electrical grid network. The compatible connector for insertion in the access connector apparatus may herein also be referred to as an "intermediate connector module" and is be described in more detail with reference to FIG. 14.

Figure 12A:
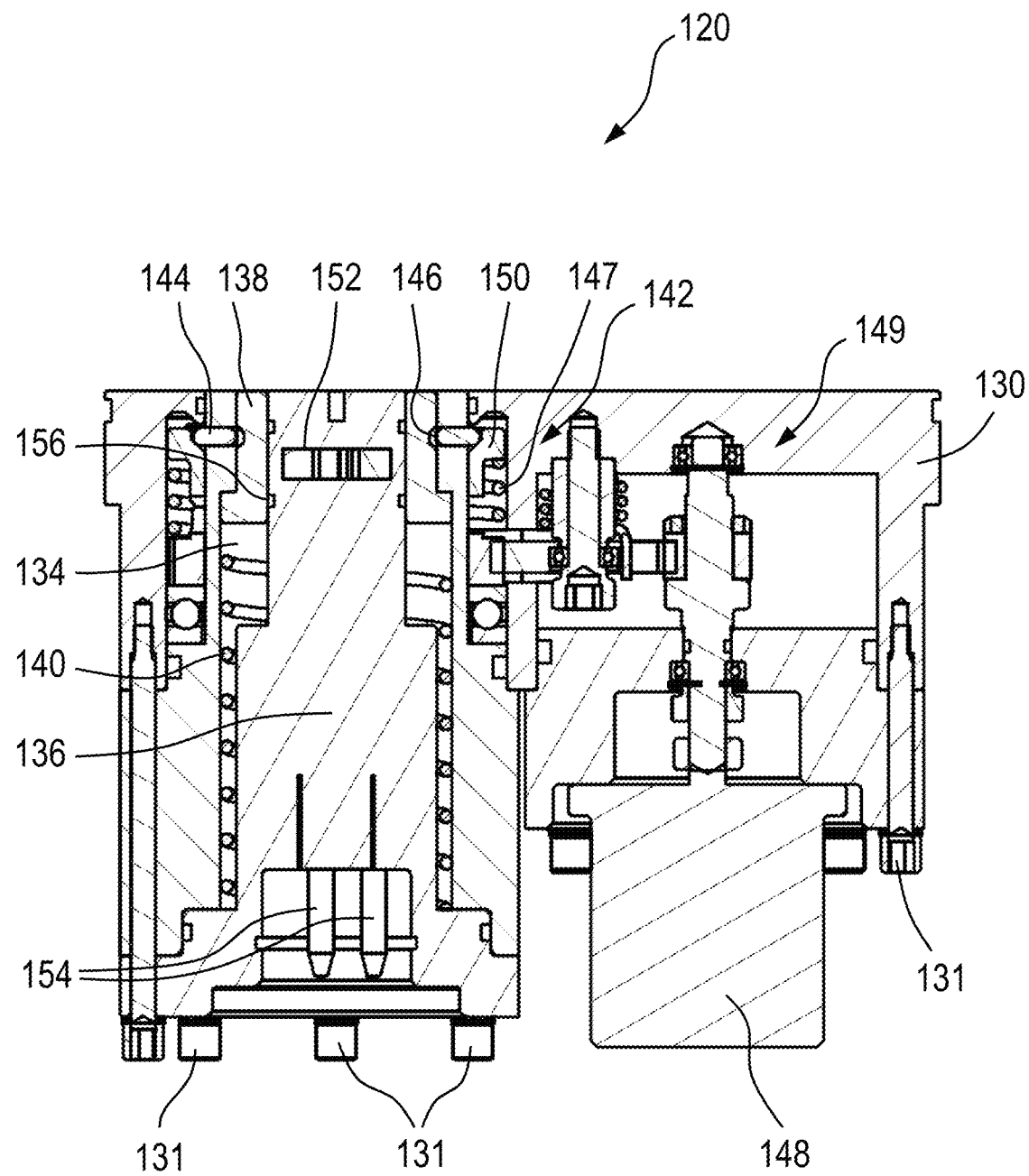
FIGS. 12A and 12B are side and perspective sectional views, respectively, of the access connector apparatus of FIG. 10, with the housing omitted.
Figure 12B:
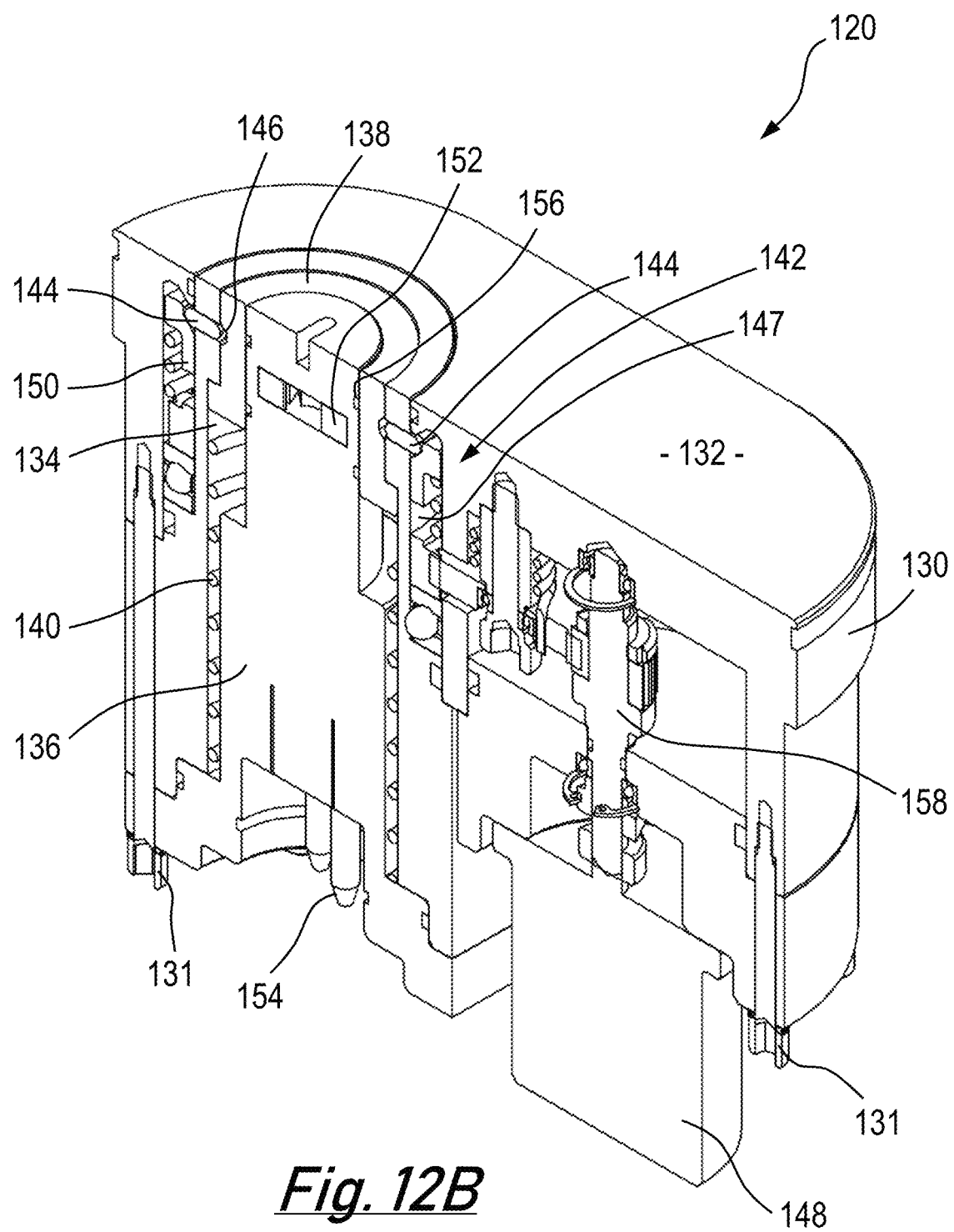

A locking plug 138 sits within the annular bore 134, and is annular in form to fill the annular bore 134. The annular plug 138 is sprung by a spring, or springs, 140 such that it is biased into an upward position, as shown in FIGS. 12A and 12B, in which the top of the annular plug 138 lies substantially flush with the top surface 132 of the access connector 120 and thus the pavement into which the access connector is incorporated. When the annular plug 138 is in its upward position, protrusion from the surface of the pavement is minimised or avoided, and there is substantially no recess which would otherwise tend to collect moisture and/or debris.

The annular plug 138 is locked in place by a locking mechanism, shown generally at 142. The locking mechanism 142 comprises a number of components, and functions to lock the annular plug 138 in place, in its upward position, and to release the annular plug 138 such that it may move axially downwards within the annular bore 134; these conditions are herein referred to as the "locked condition" and the "unlocked condition" of the connector apparatus, respectively.

The locking mechanism 142 comprises a set of circumferentially distributed locking dogs 144, engaging a recess 146 on the outer surface of the body 138 of the annular plug. The locking dogs 144 are housed in respective housing slots in the body of the access connector 120. The locking dogs 144 are operable to move between a position in which they extend radially inward into the annular bore 134 and thus the recess in the annular sleeve if it is present (i.e. a locking position) and a position in which they are retracted into their housing slots and annular void 147 (an unlocked position). The locking mechanism 142 of this embodiment comprises a motor and gear train, generally shown at 148 and 149, respectively, which control the movement of a locking control component 150 and consequently, the locking dogs 144. Power to control the motor is provided from the cable (not shown) which enters the connector 120 through the inlet in the protective housing (also not shown). The functionality and operation of the locking mechanism will be described and understood with reference to FIGS. 13A to 13D.

The connector apparatus 120 comprises a Radio Frequency Identification (RFID) reader (not shown) which is configured to detect the presence of a compatible connector and selectively operate the locking mechanism 142 between its locked and its unlocked condition. For example, in use, upon sensing the presence of a compatible connector via the RFID reader, the access connector 120 will unlock.

In alternative embodiments of the invention, other forms of actuating mechanisms for the locking mechanism 142 may be used. One example of other such actuating mechanisms is a key pad on the connector apparatus 120, which will actuate the connector 120 to lock or unlock when a certain key code is keyed in. Alternatively, instructions to actuate the locking mechanism 142 could be sent via a wired or wireless connection, via a communications network (for example the internet) that enables communication between electric vehicle operators who have connected their vehicle to the access connector apparatus 120 and the access connector apparatus 120.

With the annular sleeve 138 disengaged, downward movement of the annular sleeve 138 within the annular bore 134 of the connector 120 is enabled. The annular sleeve 138 will move downwards when it is subjected to a downward force, which, in operation, is applied by the insertion of a compatible connector, providing that the mechanism has been unlocked.

As described above, the access connector 120 comprises a number of electrically conductive contact elements 152. The contact elements 152 are arranged around the circumference of the upstanding portion 136, near its top, facing outwards into the annular bore 134. The contactor elements 152 are positioned within the connector 120 such that their contact surfaces are vertically oriented. For simplicity, only two contact elements 152 are shown, although it will be appreciated that a greater or lesser number of contact elements may be provided around the circumference of the upstanding portion 136 in alternative embodiments of the invention. The contactor elements 152 are connected to the power and communication transmission lines of the cable which runs to the access connector 120 from the electrical grid network. The number and the position of contact elements 152 in the access connector will correspond to the number and position of contact elements on the corresponding compatible connector (not shown).

The upstanding portion 136 is formed from a material which does not conduct electricity. The contactor elements 152 are connected to electrically conductive pins 154, which extend through the interior of the upstanding portion 136, from its base. When the connector apparatus 120 is installed within the protective housing (not shown) these pins 154 are connected to receive electrical power from the power and/or communication transmission lines of the cable (not shown) which enters the connector 120 through the inlet in the housing in a manner which will become apparent in the following description.

The connector apparatus 120 further comprises upper seals 156 which seal against ingress of fluid between the annular sleeve 138 and the connector body 120.

An additional feature of the access connector 120 is a visual status display arrangement, which in this is case is an arrangement of coloured LEDs (not shown) arranged on its upper surface, around the annular bore 134. The coloured LEDs provide a visual indication of the status of the connector 120. For example, the coloured LEDs may display red when the access connector is faulty and/or out of service, green when the access connector is in use (i.e. a good connection to an electric vehicle has been established) and blue when the access connector is available for use.

A trace heating ring (not shown) is positioned around the annular bore 134 of the connector. At its base, drains (not shown) are optionally provided to facilitate removal of any moisture that does make its way into the connector. Vents and/or valves (not shown) may also be positioned in this region to mitigate the likelihood of pressure build-up, and/or to facilitate discharge of moisture or vapour from the connector 120.

Figure 13A:
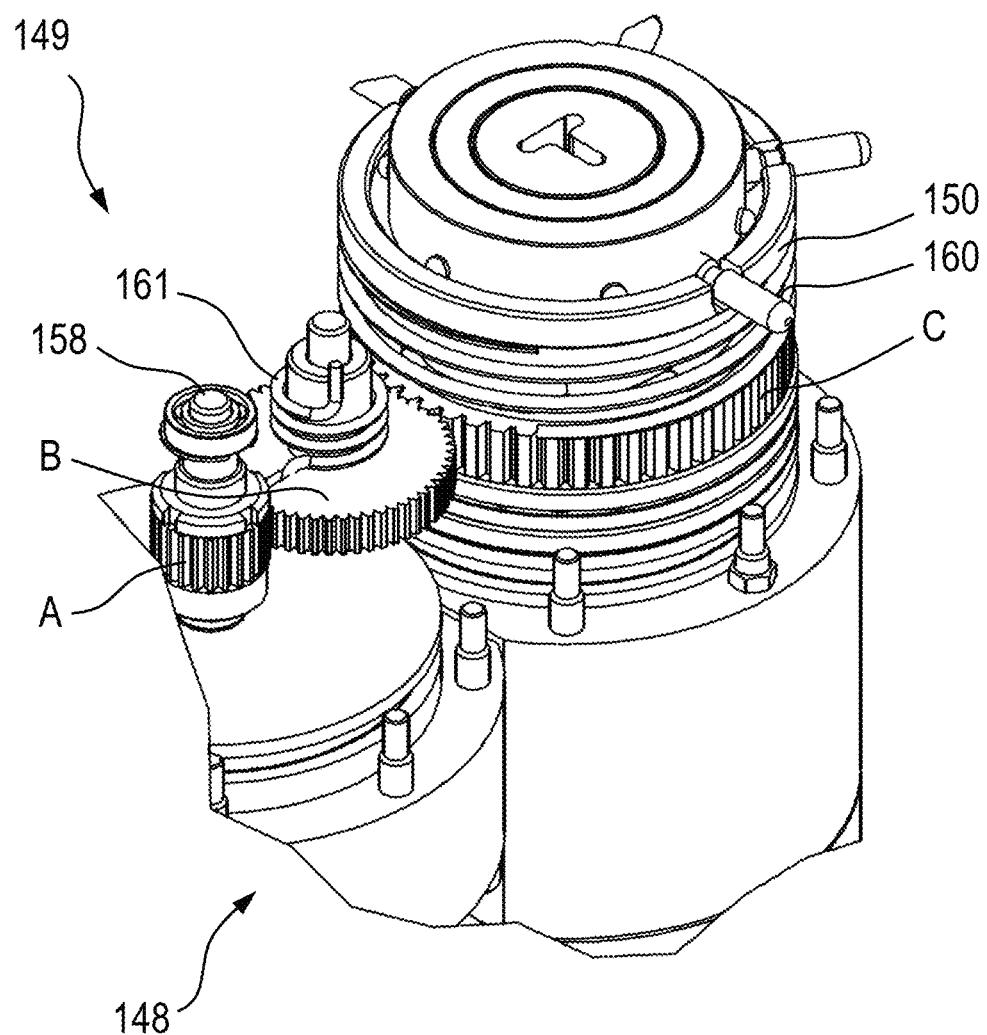
FIG. 13A is a part perspective view of the exterior of the connector apparatus of FIG. 10, showing a locking mechanism of the apparatus in more detail.
Figure 13B:
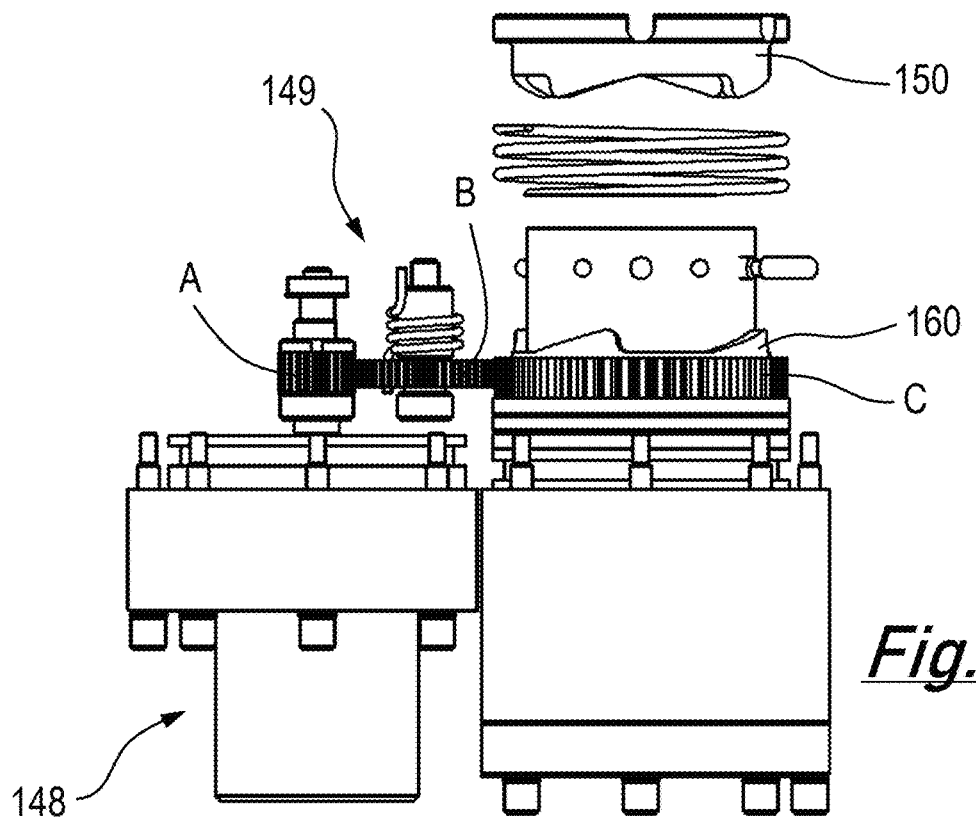
FIGS. 13B and 13C are a part exploded side view of the exterior of the connector apparatus and a part exploded side, sectional view of the interior of the connector apparatus of FIG. 10, showing a locking mechanism of the apparatus in more detail.
Figure 13C:
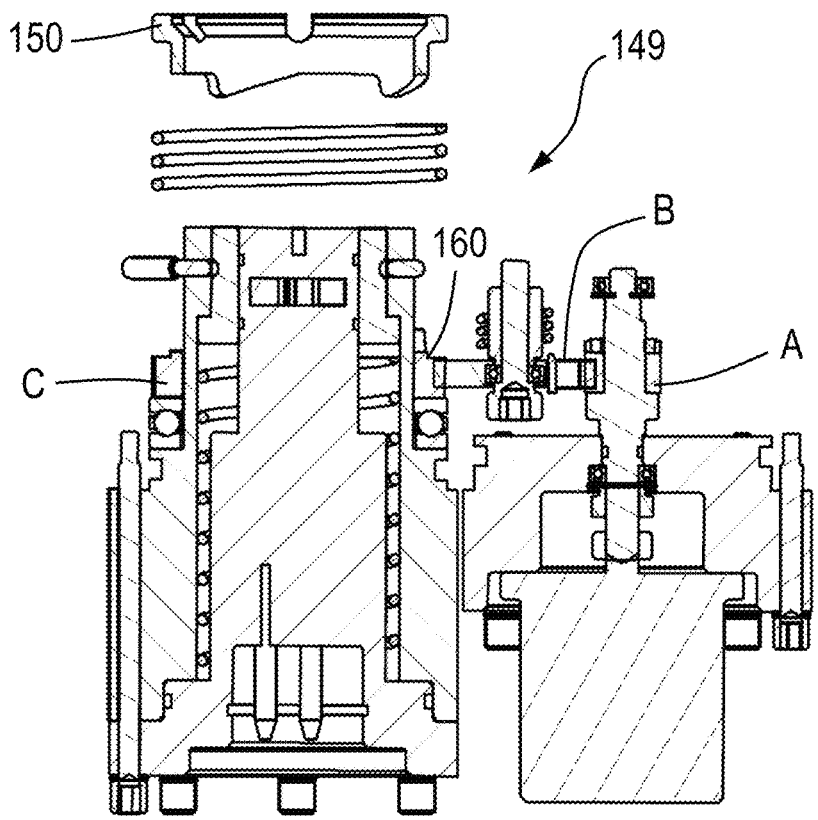

Referring now to FIGS. 13A to 13D, the operation of the locking mechanism will be described in detail. FIG. 13A shows the exterior of the connector apparatus 120 including the motor 148 and the gear train 149 with the body portion 130 of the connector apparatus 120 omitted for clarity. FIGS. 13B and 13C are partially exploded side views and sectional views respectively.

As the motor 148 rotates, drive shaft 158 also rotates which, in turn, effects rotation of a first gear, gear A. Rotation of gear A causes gear B to rotate, and likewise, rotation of gear B causes gear C to rotate. Rotation of the final gear, gear C, causes threaded portion 160 to move axially up and/or down (depending upon the direction of rotation of the motor) with respect to the axis of the connector 120. This movement locks and unlocks the connector 120. The exterior thread on the threaded portion 160 is a multi-start thread, specifically, a four-start thread. As a safety feature, the geometry and materials of the components which are in threaded engagement are selected such that the thread is self-locking (i.e. it cannot be driven by application of an axial load). Therefore, in order to move the connector between the locked and unlocked conditions, a torque must be applied to the driven threaded portion 160 as explained above.

Figure 13D:
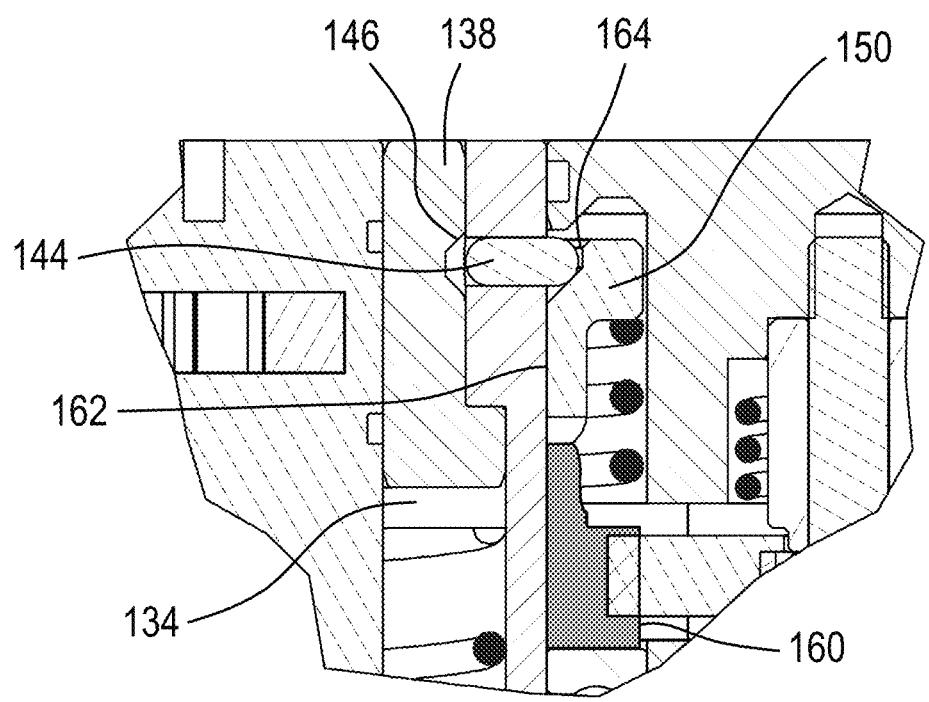
FIG. 13D is a detailed sectional view through part of the connector—in particular, the locking mechanism—of FIG. 10.

A detailed sectional view through the connector—in particular, the locking mechanism—is shown in FIG. 13D. The interior of the locking control component 150 is substantially cup shaped, and has two main portions, each having a different internal diameter. The bottom portion 162 of the cup has a first, smaller internal diameter, and the top portion 164 has a second, larger internal diameter. As the threaded portion 160 (shaded in FIG. 13D) is moved up and down, by operation of the motor 148 and gears 149, the locking control component 150 is also moved respectively up and down and the connector 120 is locked and unlocked.

FIG. 13D shows the locking control component 150 in its lowermost position, in which the locking dogs 144 are proximate the top portion 164 of the locking control component 150, having a second, larger internal diameter. In this position, the interior of the locking control component 150 does not apply a force to the locking dogs 144, and they are therefore free to retract into their respective housing slots and annular void 147, in which the spring and locking control component 150 is housed. In this position, the connector is unlocked.

As the locking control component 150 moves upwards, a conical transition portion between the top and bottom portions 164, 162, respectively, engages with the locking dogs 144 to push them into the annular bore 134 of the connector 120, thus engaging with the recess 146 in the annular sleeve 138 to lock it in to place.

Figure 14:
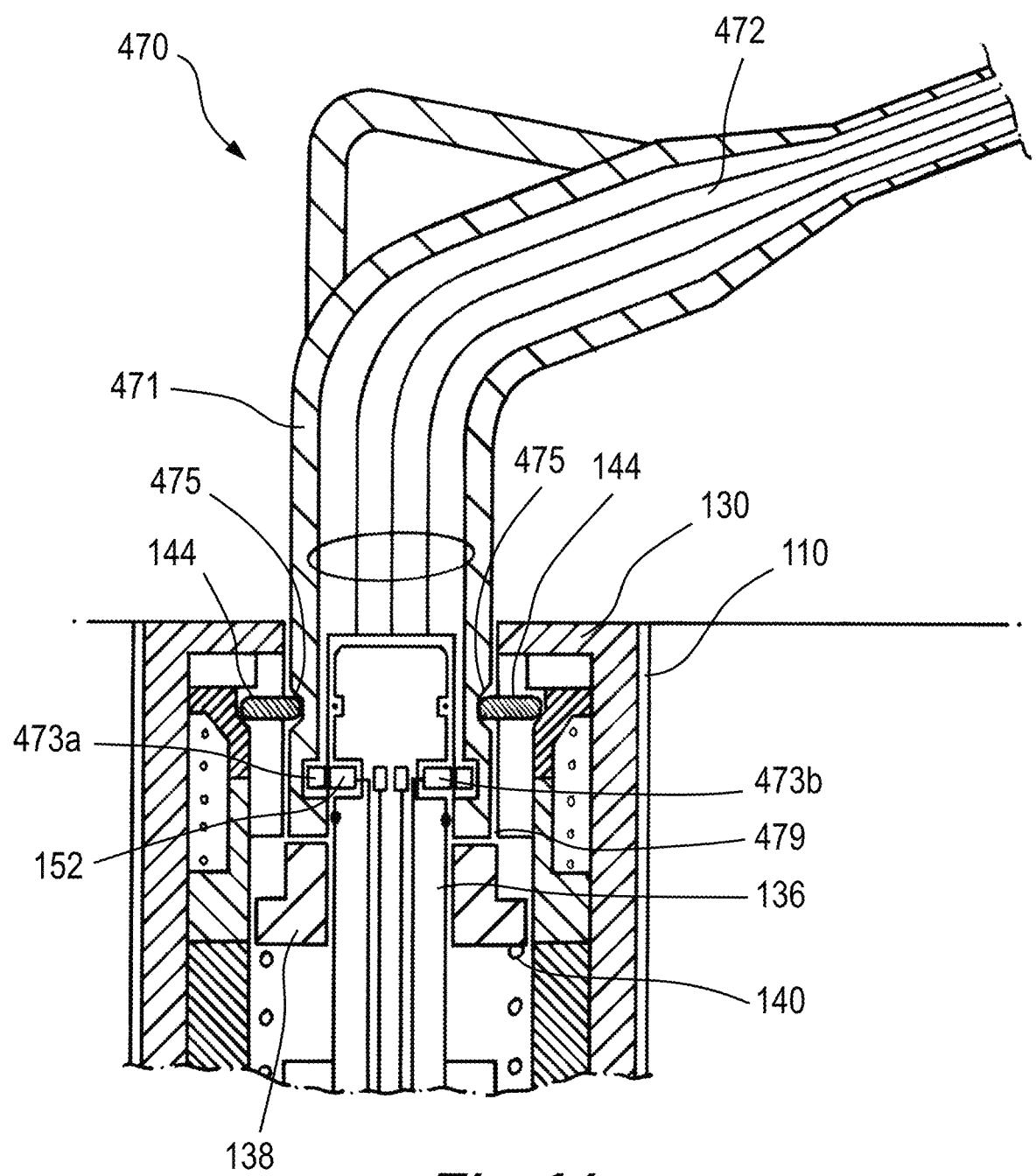
FIG. 14 is a schematic, sectional representation of the connector apparatus of FIG. 10, with an intermediate connector module inserted therein.

FIG. 14 is a schematic sectional view through the short axis of the access connector 130, shown with connection made with an intermediate connector module in the form of a rod or lance 470. The lance 470 is functionally similar to the module 170 of FIG. 6 and the lance 370 of FIG. 8, and comprises a shaft portion 471, an end 479 of which is configured to connect with the access connector 120. The end 479 of the shaft 471 is a substantially hollow cylindrical portion, a wall of which comprises locking recesses on its outer surface, corresponding to the positions of the locking dogs 144. The inner surface of the wall comprises circumferentially distributed contact electrically conductive contacts 473a, 473b, which are positioned to contact the electrical contacts 152 of the access connector 120. A central plug (not shown) is housed within the wall, and is movable between a first position at which it is located at the end of the shaft, and a second position at which it is retracted into the shaft to enable the wall to extend into the annular recess of the access connector 120. The central plug comprises a projection which corresponds with the slot in the body of the access connector apparatus so that it can only be fully inserted into the access connector apparatus in one particular azimuthal or rotational orientation, such that their respective corresponding contact elements are matched with one another.

The lance also comprises a cable 472 through which power and data/communication signals can be transmitted between the electric vehicle and the lance.

In operation, the access connector apparatus 120 is initially locked. That is, the annular sleeve 138 is locked into its uppermost position by the locking dogs 144. This is the default condition for the access connector apparatus 120 unless the connector is actively being used. In this regard, the shaft on which gear B is mounted is provided with a torsional spring 161, which biases the gear train towards a position in which the locking control component 150 is in its uppermost condition and the access connector apparatus is locked.

When the access connector apparatus 120 senses a compatible connector in close proximity (not shown), the locking mechanism will be actuated to unlock the annular sleeve 138, by moving the locking control component 150 downwards, therefore allowing the compatible connector to be inserted into the annular bore pushing the annular sleeve 138 downwards within the annular bore.

The locking mechanism may be actuated to lock the compatible connector in place by any suitable means or protocol. For example, two protocols will be described: a "timing" protocol, and a "proximity" protocol.

Under the "timing" protocol, the access connector 120 is unlocked, and remains unlocked for a certain amount of time, before it "times out" and re-locks itself. The amount of time that the access connector remains unlocked is selected to be sufficient to allow the user to insert the compatible connector into the access connector.

At the end of the set period of time, the locking mechanism is automatically actuated to move the locking dogs 144 back into the annular bore 134. The compatible connector (not shown) comprises an annular recess which is identical to the annular recess 146 on the annular sleeve 138, and is positioned proximate the location of the locking dogs 144 when the compatible connector is inserted into the annular bore 134 of the access connector apparatus 120. Therefore, after the set amount of time has passed and the locking mechanism re-locks the access connector apparatus 120, the inserted compatible connector is locked in to place in the same manner that the annular sleeve previously was.

Alternatively, under the "proximity" protocol, the access connector and the compatible connector are each be provided with proximity sensors operable to identify whether the compatible connector has or has not been inserted into the access connector. The access connector uses this information to hold itself in an unlocked state until insertion of the compatible connector is actioned, and to actuate locking of the compatible connector after its insertion into the access connector.

The compatible connector comprises a releasing mechanism which is operable to communicate with the access connector apparatus 120 to actuate the locking mechanism to unlock the compatible connector, allowing its release from the access connector apparatus 120. Although, it will be appreciated that in alternative embodiments of the invention, the access connector apparatus 120 itself may be provided with some form of releasing mechanism, which can be operated to actuate the locking mechanism to unlock an inserted compatible connector. This could be provided, for example, in the form of a key pad. Alternatively, instructions to actuate the locking mechanism could be sent via a wired or wireless connection, via a communications network (for example the internet) that enables communication between users of the access connector apparatus 120 and the access connector apparatus 120. For example, a command to actuate the locking mechanism of the connector apparatus 120 could be sent through a user's remote user interface (UI) device, such as a mobile telephone handset connected wirelessly to the internet using mobile network communications protocols.

Figure 15A:
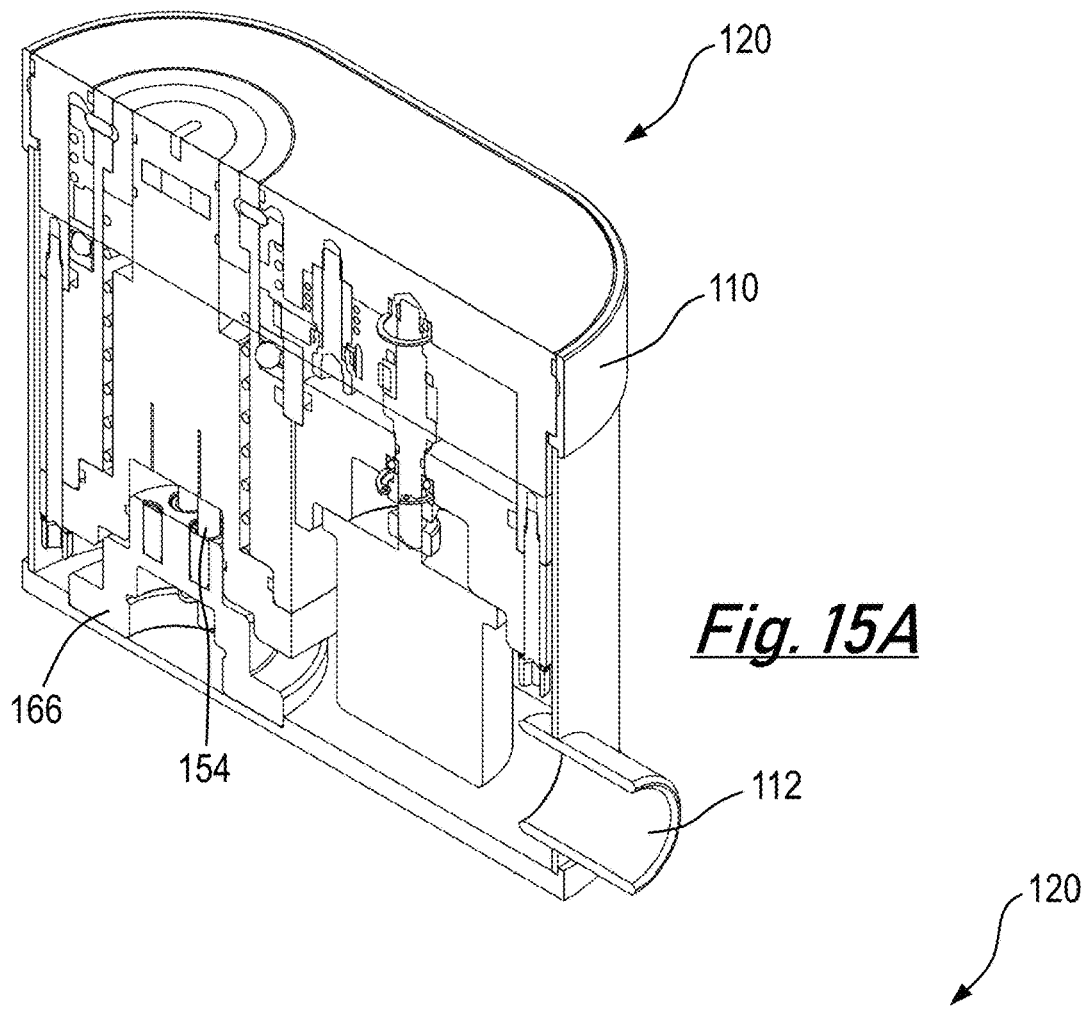
FIGS. 15A and 15B are perspective and side sectional views of the access connector of FIG. 10, installed within the housing.
Figure 15B:
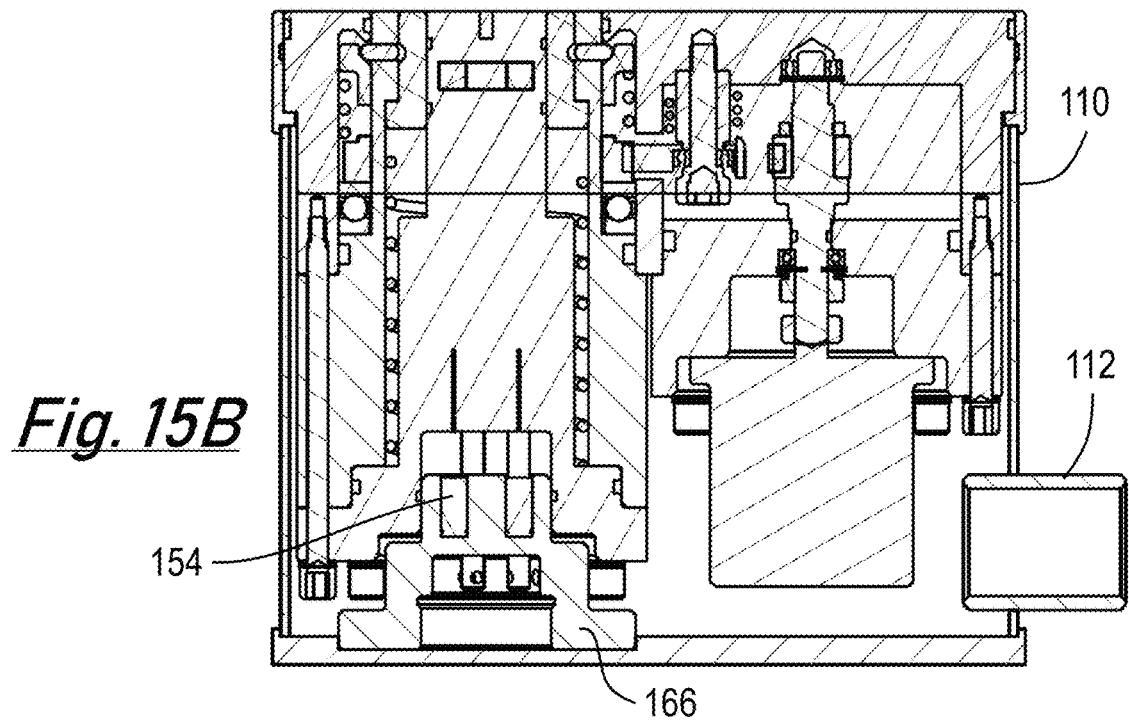

FIGS. 15A and 15B show the access connector apparatus 120 installed within the protective housing 110. A cable termination component 166 is also provided within the housing. The wires from the cable (not shown) which enters the box through the inlet 112, from the electrical grid network, are terminated into the cable termination component 166. When the access connector 120 is installed, the pins 154 enter corresponding apertures in the cable termination component 166, such that electrical power and/or communications or control data is transferred from the cable to the contact elements in the connector.

The access connector apparatus is connected to the protective housing 110 by threaded pins (not shown). The screws are inserted through the annular bore of the connector and into the body of the housing, perpendicular to the axis of the connector, such that the heads of the screws are positioned within the annular bore with their contact surfaces vertically oriented, and can only be accessed from inside the annular bore. Therefore, the annular sleeve must be unlocked and pushed downwards within the annular bore in order to gain access to the screw heads. As described, the connector apparatus 120 will only unlock when the RFID reader (not shown) detects the presence of a compatible connector, and operates the locking mechanism to unlock the annular sleeve. An authorised person who is installing, servicing or repairing the connector apparatus 120, who must insert or remove the main body of the connector apparatus into or from the protective housing is provided with a special tool, which comprises an RFID chip which will also be recognised by the connector apparatus 120 to unlock the locking mechanism. The tool is able to be inserted into the annular bore of the connector, pushing the annular sleeve downwards whilst doing so. In addition, the tool is configured such that it allows access to the inner and outer walls of the annular bore whilst it is inserted in the connector, allowing the screws to be accessed. Therefore, only a permitted person is able to gain access to the annular bore of the connector for installation and/or repair purposes.

Figure 16:
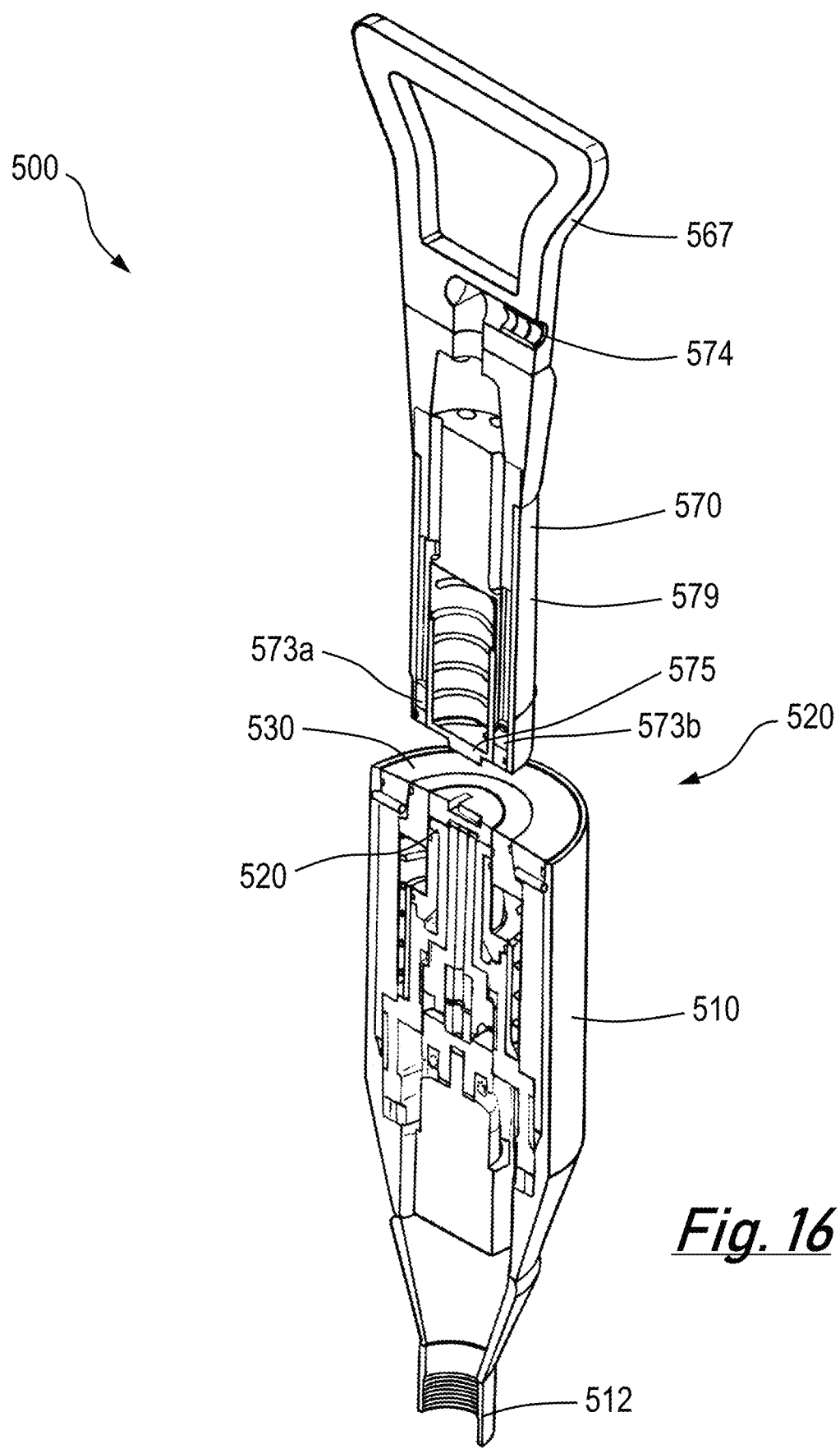
FIG. 16 is an isometric sectional view of an access connector apparatus in accordance with an alternative embodiment of the invention and a corresponding intermediate connector module.
Figure 17:
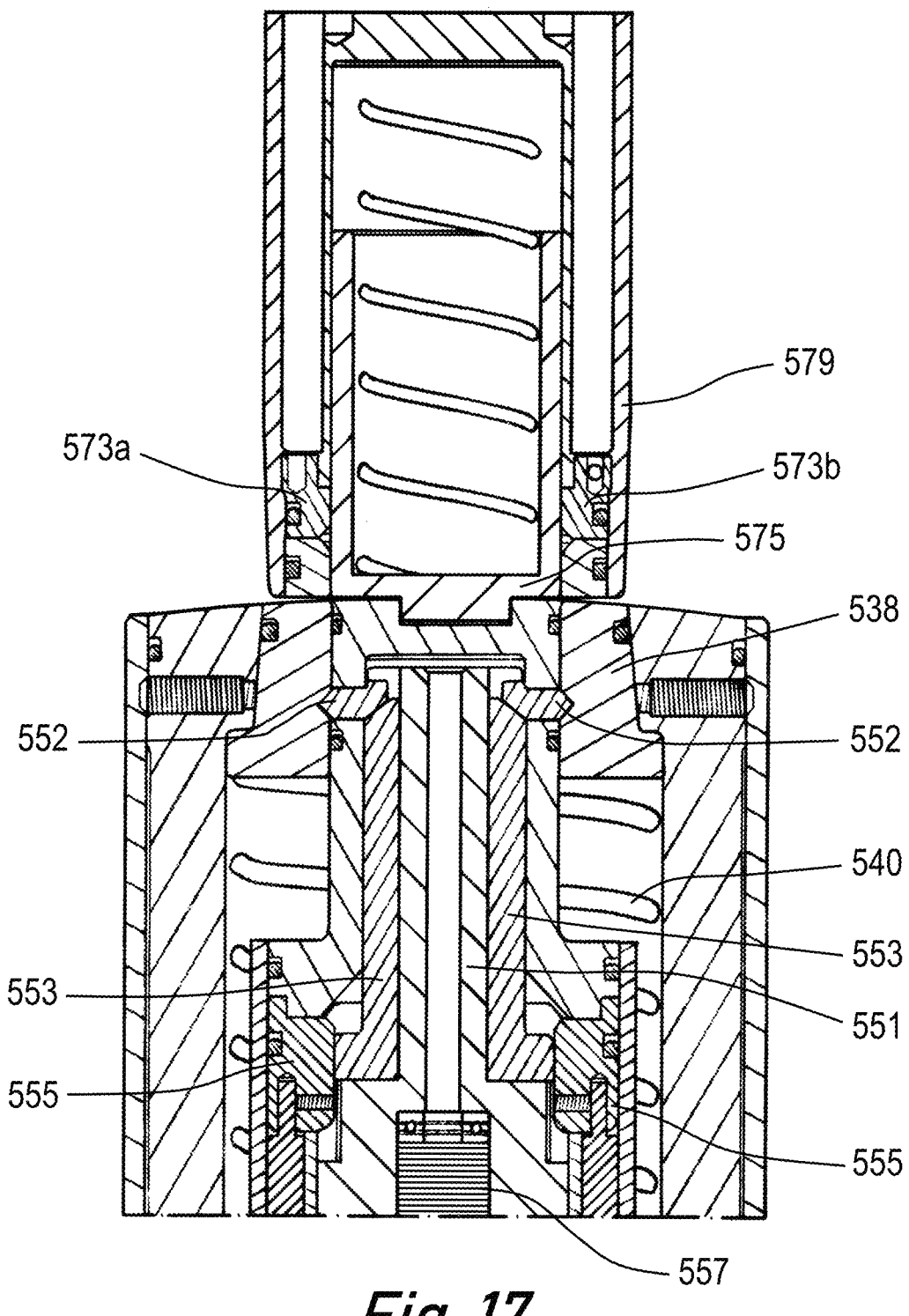
FIGS. 17 and 18 are enlarged sectional views of the access connector apparatus of FIG. 16, showing sequential insertion of the corresponding intermediate connector module.
Figure 18:
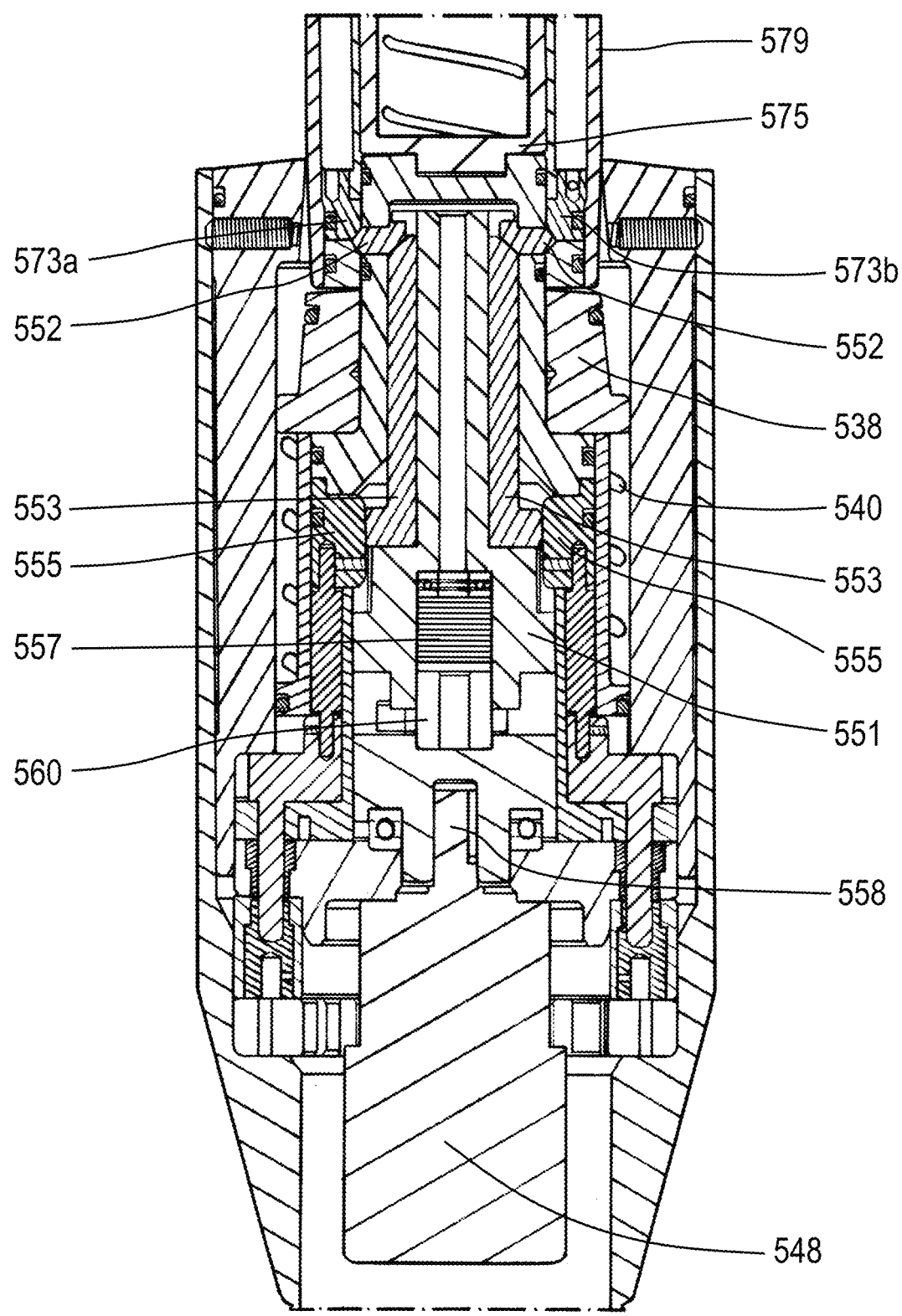

Referring now to FIGS. 16 to 18, there will be described an access connector system according to a further alternative embodiment of the invention. The system, generally shown at 500, comprises an access connector 520 mounted in a housing 510, and an intermediate connector module in the form of a lance 570. The access connector 520 and lance 570 are similar to the connector 120 and lance 470 of previous embodiments, and their features and operation will be understood from FIGS. 10 to 15 and the accompanying description. However, the system 500 differs in that the locking functionality and the electrical contact between the access connector 520 and the lance 570 are achieved by the same group of components, as will be describes below.

FIG. 16 is an isometric sectional view of the connection system 500, showing the connector 520 in the housing 510 and the lance 570 before connection, with a user preparing to insert the lance into the connector. The connector 520 comprises a 'T' profiled socket in the top of part of the body 530, and the lower part of the lance 570 comprises a corresponding 'T' shaped spigot. For successful connection the user must orientate the lance such that the T spigot engages in the T socket). Failure to do so will result in a failed connection. It will be appreciated that other similar orientation mechanisms may be employed.

It should be noted that in FIG. 16, the power cables and their cores are not shown, but a power supply cable and/or communication and data cables or lines enter the access connector at the bottom through opening 512, and the power supply to the electric vehicle from the lance 570 comes out of the side of the lance handle 567 supported in by the cable bush 574. As with other embodiments, the access connector is installed into the ground such that the top surface of the outer housing is flush with the local ground level.

As shown most clearly in FIGS. 17 and 18, the lance has a central plug 575 housed within an outer wall 579, which is movable between a first position at which it is located at the end of the shaft of the lance, and a second position at which it is retracted into the shaft to enable the wall to extend into the annular recess of the access connector 520 (see FIG. 18). The inner surface of the wall 579 comprises circumferentially distributed contact electrically conductive contacts 573a, 573b, which are positioned to contact the electrical contacts 552 of the access connector 520.

The access connector comprises a contactor housing 551 which supports first contactor parts 553, axially-oriented in the connector, and second contactor parts 552, arranged in a radially oriented ring. The first contact parts 553 extend from the upper cable termination blocks 555 to the second contactor parts 552, and are axially movable with the contactor housing, as will be described below, while remaining in electrical contact with the cable termination blocks 555. The first and second contactor parts are precision machined as a set, with mirrored 45 degree chamfer geometry on their abutting surfaces.

In the locked condition, as shown in FIG. 17, the ring of second contactor parts engages a reciprocal profiled groove in the annular plug 538, and is radially constrained in the 'radial-out position' by the first contact parts and the contactor housing 551 in its upper position.

Movement of the contactor housing and first contactor parts is controlled as follows. Firstly, a set of spring washers 557 (for example, Belleville spring washers) is preloaded by assembly of the access connector and therefore provides a bias to the contactor housing in the 'upward position' of FIG. 17, in which the second contactor parts 552 are forced into a 'radial out' position. The drive component is driven to rotate by the motor 548, via drive shaft 558. An upper surface of the drive component is provided with helical ramps, which correspond to converse helical ramps on a lower surface of the contactor housing 551. A bush 560 applies an axial load between the drive component, the contactor housing 551, and the first contact parts 553. Rotation of the drive component rotates the relative position of the upper and lower helical contact ramps, in order to move the contactor housing 551 upwards or downwards, depending upon the direction of rotation. By operating the motor 548 to move the contactor housing 551 upwards, the contactor housing 551 is not only biased in the upward position by the spring washers 557, but it is now also locked in this position by the components which are in threaded engagement, 551, 560, and the second contactor parts 552 are forced and locked in the 'radial out' position.

Conversely, rotation of the drive component 560 in an opposite direction causes the contactor housing 551 to move downwards, allowing the second contactor parts 552 to move radially inwards, such that the connector 520 is in an 'unlocked condition'.

As a safety feature, the geometry and materials of the threads (not shown) of the components which are in threaded engagement, 551, 560, are selected such that the thread is self-locking (i.e. it cannot be driven by application of an axial load). Therefore, in order to move the connector 520 between the locked and unlocked conditions, a torque must be applied to the driven component 560, which is provided via the motor 548 as explained above.

As the user prepares to insert the lance 570 into the connector 520 (FIG. 17), the control system of the connector authenticates the lance 570 and operates the motor 548 to move the connector 520 into the unlocked condition. In the unlocked condition, the contactor housing 551 is permitted to be moved downwards. However, at this point, the spring stack 557 continues to hold the contactor housing 551 in the upward position.

Upon insertion of the lance 570, the axial force applied by the user pushing the lance 570 will result in compression of the spring stack 557 and downward movement of the contactor housing 551. As the annular plug 538 is pushed downwards by the lance 570 it forces the second contactor parts 552 radially inward, onto the 45 degree interface with the first contactor parts 553, causing the contactor housing 551 to move downwards. As the contact surface between the first and second contactor parts is inclined at 45 degrees there is a unity ratio between radial and axial movement of the mating parts (for example, for every 1 mm the first contactor parts 553 moves axially downwards the second contactor parts 552 move 1 mm radially inwards). Insertion of the lance also compresses a spring 540 which normally biases the annular plug 538 into its uppermost position.

In addition, as the lance 570 is inserted into the connector 520, the top part of the body 530 of the connector forces the central plug 575 of the lance to be moved into the second position, in which it is retracted into the shaft to enable the wall to extend into the annular recess of the access connector 520.

When the lance 570 is inserted fully into the connector 520, the second contactor parts 552 are biased to move radially outwards into a profiled groove in the lance 570, which corresponds to that which is provided in the annular plug 538. In this position, the electrically conductive contacts 573a, 573b of the lance 570 are in engagement with the second electrical contractor parts 552 of the access connector 520, and the lance 570 and the access connector 520 are in a fully engaged condition.

The electrical circuits between the lance 570 and the access connector 520, and therefore the electric vehicle (not shown) connected to the lance, are now connected. At this stage, the control system of the connector operates to lock the lance 570 in the connector 520 by operating the motor 548 to move the connector 520 into the locked condition.

Therefore, in this embodiment of the invention the second contactor parts 552 serve the dual function of providing the required electrical connections between the connector 520 and lance 570 and of providing the locking function to secure the lance 570 in the connector 520 (or to secure the plug 538).

Once the lance 570 has been inserted, and the electrical circuits between the lance 570 and the access connector 520 are connected, the control system of the connector 520 runs a series of electrical continuity and integrity checks. If the results of these checks are satisfactory, the connector 520 provides an indication to the user (via LED lights or otherwise) that a satisfactory connection has been made, and an appropriate electrical supply is delivered to the electric vehicle (not shown) which is coupled to the lance 570.

The lance 570 is removed from the connector 520 in a process which is the reverse of the process described above.

The above-described embodiments of the invention use an intermediate connector module disposed between, and designed to be connected and disconnected to each of, an access connector and a vehicle cable. This provides a convenient and effective means of connection and has various advantages relating to the simplicity of the access connector and the permanently or semi-permanently installed connection infrastructure. However, it will be appreciated that principles of aspects of the invention are not limited to systems which use such intermediate modules. For example, a corresponding connector for the access connector may be integrated into a vehicle connection cable rather than a being a separable component. Alternatively or in addition, the functionality of the intermediate connector module may be integrated with the electric vehicle, optionally via a cable forming a part of the vehicle's own connection subsystem.

Figure 19:
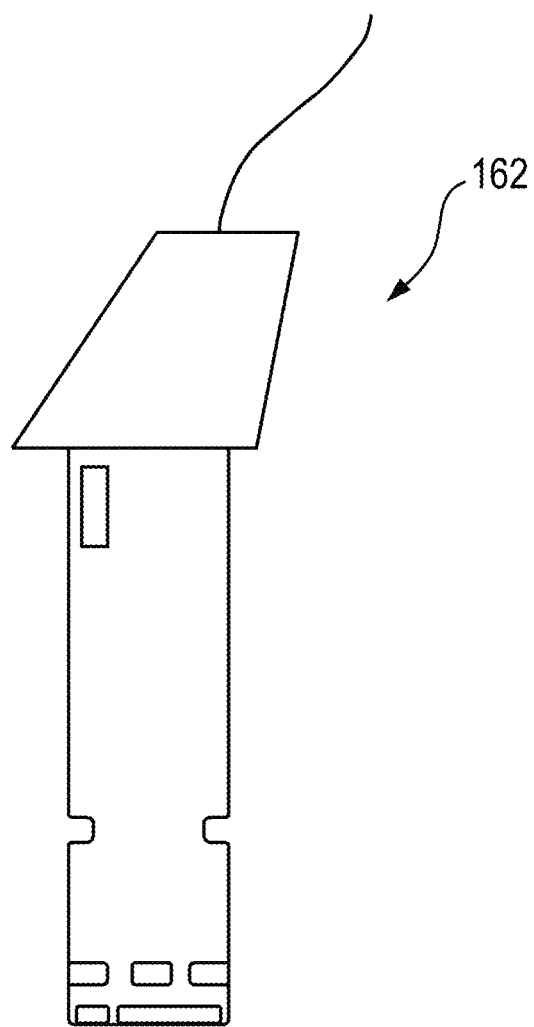
FIG. 19 is a is a side view of an electric vehicle cable connector according to an alternative embodiment of the invention.

In this regard, FIG. 19 is a side view of an electric vehicle cable connector according to an alternative embodiment of the invention. The connector, generally shown at 162, comprises a body which is similar to the lower end of the lance 370, and is designed to connect to and engage with an access connector 220. The connector 162 differs in that it does not include an extended shaft, and instead connects to the access connector substantially at ground level, with the cable leading from the upper end to the vehicle connector. In this embodiment, the cable is integrated with the connector, rather than being separably connected.

The use of a control and distribution module and a plurality of access connectors each connected to and controlled from the control and distribution module facilitates effective control and management of a charging process in dependence on at least one of a range of factors, including but not limited to the identification of the electric vehicle user and the user's preferences or account status; the charge status of the electric vehicle; an overall load requirement in the locality of the module; or electric power resource availability.

As previously noted, preferred implementations of the invention will have a plurality of control and distribution modules, each serving a respective plurality of access connectors in a particular locality. Multiple control and distribution modules may communicate with the same remote data processing and control centre (and indeed a single remote data processing and control centre may communicate with a large number of control and distribution modules).

The control and distribution module has a current and load sensing capability that can monitor the load being drawn from it at any one time, from one, some, or all the active access connectors. The acquired data may be processed locally (i.e. at the control and distribution module), and/or the control and distribution module may send the acquired data to the data processing and control centre for processing. The electrical power resource available to the control and distribution module and the demand (instantaneous and/or predicted) can therefore be taken into consideration when determining how electrical power is transmitted to individual electric vehicles connected to its access connectors. Other factors may also be taken into consideration, and may include the identity of the user, or some other user attribute, for example an account or subscription status with one or more electric power suppliers, preconfigured or requested user preferences, or a combination of the two.

In this regard, it is beneficial if the control and distribution modules are connected to the electrical network at the distribution voltage level, as in the described embodiments. Each of the control and distribution networks receives three-phase electrical power from the grid (for example at 415V), and is capable of transmitting to each access connector three-phase electrical power or single-phase electrical power, depending on the factors described herein.

Figure 20:
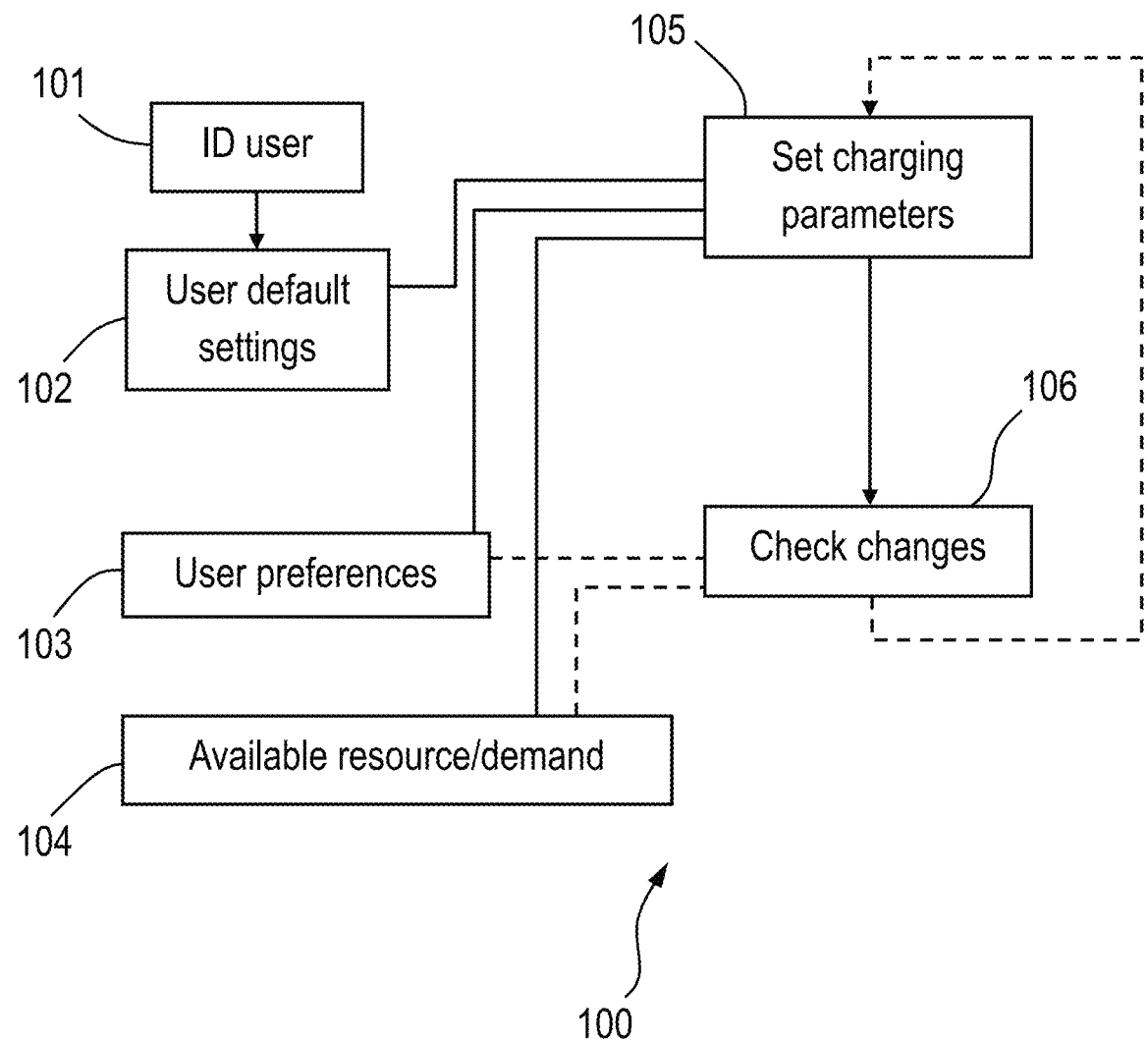
FIG. 20 is a block diagram representing a method of charging an electric vehicle according to an embodiment of the invention.

An example of a charging management method is presented in FIG. 20. The method, generally depicted at 100 begins with identification of the user (step 101), which similarly to method 90, may be via the user's remote UI device, for example by a mobile data communication link with the remote data processing and control centre 40, an intermediate connector module, from an identification code of the vehicle or by other means. With the user identified to the system, a database (which may be remotely hosted) is interrogated to determine the account status and/or subscription status of the user, and any preconfigured user settings including for example at least one of vehicle type, preferred charging requirements, billing preferences, contact methods, preferred electrical power suppliers if applicable (step 102).

The user also has an opportunity to select or set charging parameters (step 103), for example via their remote UI device or optionally through a connector module to be coupled to the access connector. This enables the user to set their requirements for the particular charging process, which may override predetermined or default settings. Settings may include for example the selection of a supplier or tariff, setting a "priority" status of the charge required, indicating a time for which the vehicle will be connected to the system at the current location, or a required end charge status. A "priority" status may prioritise charging of the user's vehicle over those of other users, for example in return for paying a surcharge or higher rate to the supplier. The user selects any of these various options using their remote UI device 60, which then informs the data processing and control centre 40, which in turn controls the transmission of power to the relevant connector.

The transmission of electric power to any particular access connector can be controlled in the context of overall resource available to the control and distribution module, and current or predicted load demand from others of its access connectors (step 104). For example, a control and distribution module may only be able to draw a certain amount of load from the electricity network at any one time, and there may be a number of vehicles connected to or predicted to be connected to the system. The different vehicles are competing for the available resource, and transmission to the different vehicles may be managed in dependence on the resource as well as the settings and preferences of the individual users.

The charging parameters for a particular user are set (step 105) in dependence on the resource/demand information and the requirements of the user. This includes for example selecting whether three-phase electrical power or single-phase electrical power is transmitted to the access connector.

Periodically, the system carries out checks (step 106) on both the user preferences and the available resource and demand. If circumstances change, for example if additional vehicles have connected to the access connectors of the control and distribution module, or if a user has changed their status to a lower priority, then the charging parameters can be changed or re-set, for example by switching from three-phase electrical power to single phase electrical power. Conversely, if vehicles are disconnected from the access connectors or are no longer drawing load (for example have reached a fully charged state), or if a user changes their status to a higher priority charge requirement, then the charging parameters can be changed or re-set to increase the load drawn by the user's vehicle (for example by switching from single-phase electrical power to three-phase electrical power). Local processing (in the control and distribution module) or remote process (in the remote processing and control centre) may determine the correct charging parameters across all current users of access connectors of a given control and distribution module. This may be carried out automatically with reference to a decision-making tables or software algorithms based on combinations of user status, vehicle charge status, and available resource and demand, with a user being informed about a change in charge status. Alternatively, or in addition, a user may be informed about a change in charge status through their remote UI device, and may be afforded an opportunity to influence the change by updating its settings. For example, a user may be able to prevent moving to a slower charging program by opting to upgrade their status to a higher priority, and potentially more costly, charging tariff.

These methods therefore present a dynamic method of managing distribution of electrical power to a range of access connectors (and therefore charging points) for electrical vehicles. The system can distribute the power in a number of ways. As described above, particular access connectors can be switched between three-phase and single phase electrical power. Another way that the system can distribute power is to begin to sequentially cycle the power supplied to each access connector. Another alternative is to stop transmitting power altogether to access connectors which are coupled to electric vehicles which are charged to a certain percentage. It will be appreciated that the system may use any other suitable alternative methods to reduce the load being drawn by the access connectors.

Similar approaches may be used to manage the demand on the electricity network across a plurality of control and distribution modules. Depending upon a number of factors, such as the time of day or the current demand on the electricity network, the power resource available to a particular substation, or to a particular subset of control and distribution modules, may go up or down. Real time information relating to changes in resource and demand may be communicated to the control and distribution modules, and the transmission to electric vehicles may be modified accordingly to manage the demand appropriately. Characteristics of the vehicles and users may be used to determine the allocation of power distributed on a local level, and/or to set manage the resource available across a plurality of control and distribution modules.

Typically, any changes made by the system to the charging parameters of a vehicle will be communicated to the users by sending an alert or notification to the remote UI devices associated with the applicable access connectors/users.

In an advantageous implementation of the invention, a user interacts with the system via a dedicated user software client application running on a portable UI device. The software application interacts with software hosted on hardware at a remote location, for example the remote processing and control centre via the internet or mobile communications protocols. A registered user is able to (for example) manage a user account or subscription through the software application, change settings and preferences, view information relating to charging activity or history, and view and update information relating to payment and billing options. In particular, a user is able to view status of an ongoing charging operation, and control the operation according to changing requirements or in response to status changes enacted or proposed by the system.

A number of different billing options may be implemented according to embodiments of the invention. A user may be billed for their usage through the software on their remote UI device 60, which works in conjunction with a metering module included in the control and distribution module 30. A user may pre-load money to credit an associated account which is linked to the system using their remote UI device. The user may also select between different charging tariffs and suppliers where applicable. In an alternative payment arrangement a user who has a company car, and the company in question has arranged to open an account with the electricity provider so that their employees do not have to pay directly for charging. Implementations of the invention may perform billing account status checks before enabling transmission of electric power to a user's vehicle.

Foregoing embodiments of the invention relate to the use of the connection system in charging operations. However, an alternative use of the system, facilitated by the use of control and distribution modules, is the transmission of electrical power from storage devices in electric vehicles to an electricity network, and/or to other storage devices in local or remote electric vehicles. Such an implementation may be revenue-generating for a user (in financial or "charging credit" terms), may be part of the management of resource and demand on a local level by the control and distribution modules servicing demand to its access connectors, or may be a part of a more general management of resource available to a plurality of control and distribution modules.

Figure 21:
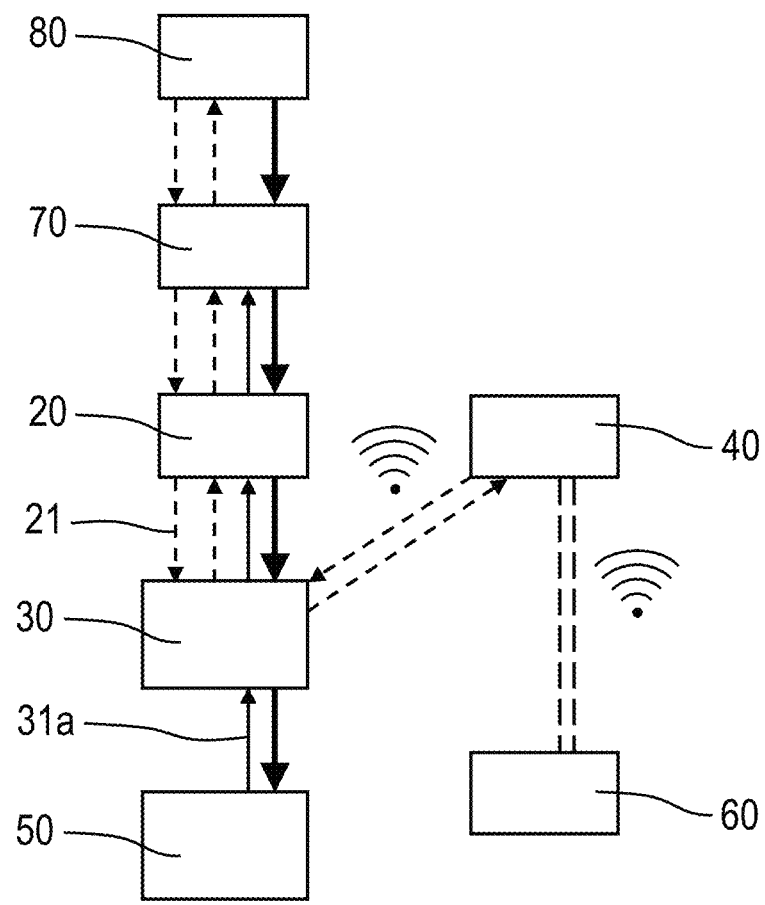
FIG. 21 is a block diagram representing a method of transmitting power to an electricity network according an alternative embodiment of the invention.

Referring now to FIG. 21, there is shown a block diagram of a system for transmitting electrical power from electric vehicles to an electricity network. The system is functionally similar to the system of FIG. 1, and comprises a control and distribution module 30 connected to a plurality of access connectors (one shown at 20), for the connection of a vehicle 80 (in this case via an intermediate connector module 70). The control and distribution module 30 is connected to an electricity substation 50, and communicates with a remote processing and control centre 40, in this case via wireless communication links.

Additionally, the system 10 is linked by the data processing and control centre 40 to a remote UI device 60 through a wireless communication connection. The remote UI device can be any mobile device such as a smartphone or a tablet and, as such, the software may be in the form of a mobile application.

The charge status of the electric vehicle is monitored by the control and distribution module 30, and dependent on the user's settings and preferences, electric charge stored in the storage means of the vehicle may be accessible to the system, for example to increase the resource available to the control and distribution module 30 for charging other vehicles, to dynamically manage overall load drawn from the control and distribution module 30 or the electricity network to which it is connected, or to transmit electrical power back to the grid. Inverters and other related controls may be incorporated into the control and distribution modules to facilitate transmission of electrical power from vehicles to the electricity network. The access of the system to an electric vehicle may be managed by a user via its remote UI device 60.

It was noted above that there are various advantages relating to the simplicity of the access connector and the permanently or semi-permanently installed connection infrastructure. There are also associated benefits relating the installation and deployment of access connectors as will be described below.

Installation of large numbers of conventional charging stations is relatively expensive and disruptive, particularly as it typically requires an investment in infrastructure prior to identification of sufficient demand for use of the access connectors. This is an ongoing problem; a critical mass of electric vehicles used in a particular locality is required to make an infrastructure investment viable, and a lack of available infrastructure hampers sales of electric vehicles. The arrangement of control and distribution modules facilitates a staged installation of access connectors in locations in which a future need for connection facilities has been identified, or in which there is some current demand for connection facilities, which is expected to increase in the future.

In this example, some of the access connectors are to be available for use immediately, and some are not intended for use until some later date in the future. In a first installation phase, a control and distribution module is installed and connected to the local electrical substation via power cable, thus establishing the connection between the module and the grid. Also in the first phase, the locations of the access connectors are selected and excavated accordingly. The proposed route between each access connector and the control and distribution module (i.e. the location of each cable) is also excavated to allow each cable to be laid.

In locations where access connectors are to be provided for immediate use, access connectors are installed and connected to each respective cable by termination of the cables in the respective access connectors. Each cable is also connected up to a respective discrete cable connection point on the control and distribution module and is therefore available for use.

In locations where access connectors are not currently intended for use, for example at intervals along the route of the cables, "blank" or "dummy" units are installed in the form of access ports. These access ports do have a provided cable, but are left unterminated and therefore unconnected to the cable. Similarly, at the control and distribution module, the unused cables are not connected up to the respective cable connection point. The ends of each cable are protected and made watertight (for example, by end covers, tape, or any suitable alternative). Each cable leading from the control module to each dummy access connector is therefore disconnected at both ends.

The access ports are produced from waterproof, durable and non-conductive materials, but are considerably cheaper in cost than the installation of the full access connector. In addition, the provision of additional access ports along the cable route adds little to the installation cost of the access points being installed. This approach has the advantage that all cables, irrespective of whether a real access connector or an access port are installed in a single step, and the roadside and/or pavement infrastructure may be re-instated around them.

In a second phase of installation, when the decision has been made to bring more access connectors online, one or more of the access ports is replaced with an access connector in a predetermined location. Each access connector is installed into a pre-prepared access port, and is connected to its respective cable below. Each applicable cable is also connected at the control and distribution module end to its respective discrete cable connection point on the control and distribution module. Thus the second phase can be performed quickly, efficiently and at low cost, without substantial disruption to roadside infrastructure (which was carried out in the first installation phase). More access connectors may be added to the system in third or further phases if required. By carrying out this staged approach to access connector installation, initial investment can be reduced, and further investment can be managed and in accordance with increases in demand.

The invention provides an access connector, or a system of such connectors, for accessing an electrical network and a method of use. The access connector is configured to be installed in roadside infrastructure to be substantially flush with an outer surface of the of the roadside infrastructure, and wherein the access connector provides a mechanical and electrical connection point for an electrical vehicle connector.

Various modifications to the above-described embodiments may be made within the scope of the invention, and the invention extends to combinations of features other than those expressly claimed herein.

The invention claimed is:

1. An access connector for accessing an electrical network, wherein the access connector comprises a body portion configured to be installed in roadside infrastructure such that an installed access connector provides a mechanical and electrical connection point for an electrical vehicle connector and has a top surface that is substantially flush with a surface of the ground; and wherein the body portion of the access connector comprises a bore and locking plug which is axially movable within the bore to allow insertion of the electric vehicle connector into the bore.

2. The access connector according to claim 1, wherein the access connector is configured to be integrated into a pedestrian walkway adjacent a vehicle carriageway.

3. The access connector according to claim 1, wherein the access connector is configured to facilitate and/or control the transmission of electrical power between the electrical network and an electric vehicle, via the electric vehicle connector.

4. The access connector according to claim 1, comprising a locking mechanism operable to lock the locking plug into an upper position in the bore and operable to release the locking plug to allow downward movement of the locking plug into the bore of the access connector when a downward pushing force is applied to the locking plug.

5. The access connector according to claim 4, wherein the locking mechanism comprises a locking component in a recess in an inner wall of the bore of the access connector.

6. The access connector according to claim 5, wherein the locking component is electrically conductive, and is configured to provide electrical contact between the access connector and a corresponding electrical vehicle connector.

7. The access connector according to claim 4, wherein movement of the locking mechanism between a locked and an unlocked position is actuated by a motor.

8. The access connector according to claim 4, wherein the locking mechanism of the access connector is actuated by a Radio Frequency Identification (RFID) signal.

9. The access connector according to claim 1, wherein the access connector is configured to accept an intermediate connector module, the intermediate connector module operable to be connected to an electric vehicle.

10. The access connector according to claim 1, configured to receive a cable comprising a power transmission line or lines and/or a communication transmission line or lines.

11. The access connector according to claim 1, comprising one or more additional functional features selected from the group consisting of: coloured lights which provide a visual indication of the status of the connector, trace heating elements, cleaning rings, seals, a computer, pressure vents, valves and drains.

12. An intermediate connector module for connecting to an access connector for accessing an electrical network according to claim 1.

13. A system for connecting electric vehicles to an electrical network, the system comprising:
a plurality of access connectors operable to receive power from the electrical network,
wherein each of the plurality of access connectors are installed in roadside infrastructure such that each access connector of the plurality of access connectors provides a mechanical and electrical connection point for an electrical vehicle connector and has a top surface that is substantially flush with the ground; and
wherein each access connector of the plurality of access connectors comprises a bore and a locking plug which is axially movable within the bore to allow insertion of the electric vehicle connector into the bore.

14. The system according to claim 13, wherein at least a subset of the plurality of access connectors is integrated into a pedestrian walkway adjacent a vehicle carriageway.

15. The system according to claim 13, wherein the plurality of access connectors is connected to the electrical network, and the electrical network is a conventional electrical grid suitable for municipal electricity supply.

16. The system according to claim 13, wherein the system is operable to control distribution and transmission of electrical power from the electrical network to one or more electric vehicles connected to the plurality of access connectors.

17. The system according to claim 13, wherein the system is operable to control distribution and transmission of electrical power from one or more electric vehicles connected to the plurality of access connectors back to the electrical network.

18. The system according to claim 13, comprising a control and distribution module connected to the electrical network and serving a plurality of access connectors within a certain predetermined locality or vicinity of the control and distribution module.

19. The system according to claim 18, comprising a plurality of control and distribution modules, each control and distribution module connected to the electrical network and serving a plurality of access connectors in different localities or vicinities.

20. The system according to claim 18, wherein the control and distribution module comprises one or more features selected from a group consisting of: a metering module, an ambient temperature sensor, a residual current device (RCD) and fault sensing element, a computer, one or more communication modules, a transformer, an inverter and a rectifier.

21. The system according to claim 13, wherein each of the plurality of access connectors is installed in a location selected from the group consisting of: a pedestrian walkway, a cycle path, a car parking facility, or at the side of a vehicle carriageway.

22. The system according to claim 13, wherein each of the plurality of access connectors is installed adjacent a roadside.

23. The system according to claim 13, further comprising a plurality of intermediate connector modules, each intermediate connector module operable to be connected to an electric vehicle.

24. The system according to claim 23, wherein each of the plurality of intermediate connector modules is operable to be inserted into an access connector when the locking plug is unlocked, to connect an electric vehicle to the system.

25. The system according to claim 24, wherein each access connector comprises a locking mechanism operable to lock an inserted intermediate connector module in the access connector, wherein the locking mechanism of an access connector is operable to unlock and release an inserted intermediate connector module by operation of a releasing mechanism.

26. The system according to claim 25, wherein the releasing mechanism comprises an RFID chip on an intermediate connector module and an RFID reader on the access connector.

27. The system according to claim 25, wherein the releasing mechanism is operable to be released in response to a control signal sent from a user interface (UI) device to the respective access connector.

28. A method of connecting an electrical vehicle to an electrical network using the system of claim 13.

29. The method according to claim 28, comprising identifying or authenticating a user of the electric vehicle to the system.

30. The method according to claim 28, comprising transmitting power to the electric vehicle.

31. A method of charging an electrical vehicle using the system of claim 13.

32. The method according to claim 31, comprising monitoring the status of charge of the electric vehicle connected to at least one of the plurality of access connectors.

33. The method according to claim 31, comprising controlling the electrical power transmission to the at least one of the plurality of access connectors at least in part in dependence on the status of charge of the at least one electric vehicle.

34. A system for connecting electric vehicles to an electrical network, the system comprising:
a plurality of access connectors operable to receive power from the electrical network, each of the plurality of access connectors having a top surface that is substantially flush with a surface of a pavement, a bore and a locking plug which is axially movable within the bore to allow insertion of an electric vehicle connector into the bore.

35. An access connector for accessing an electrical network, wherein the access connector has a top surface that is configured to be substantially flush with a surface of the ground when installed;
wherein the access connector has a locked condition and an unlocked condition; and wherein in the unlocked condition an intermediate connector module is operable to be connected to the access connector to access the electrical network.

36. An access connector for providing access to an electrical network, the access connector comprising:
a top surface that is configured to substantially flush with a surface of the ground when installed; and
an aperture and a locking plug moveably positioned within said aperture, where the connector has a first closed condition in which the top of the plug is flush with the top surface of the access connector and is locked in place, and a second open condition in which the plug is unlocked and downward movement of the plug within the aperture of the access connector is permitted.

* * * * *